US007669329B2

(12) United States Patent
Ogawa et al.

(10) Patent No.: US 7,669,329 B2
(45) Date of Patent: Mar. 2, 2010

(54) APPARATUS OF FABRICATING AND METHOD OF FABRICATING LIQUID EJECTION HEAD, AND LIQUID EJECTION HEAD

(75) Inventors: Hideyuki Ogawa, Nagano-ken (JP); Koichi Saito, Nagano-ken (JP); Nagamitsu Takashima, Nagano-ken (JP); Katsumi Motojima, Nagano-ken (JP); Katsunori Ono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 28 days.

(21) Appl. No.: 12/053,470

(22) Filed: Mar. 21, 2008

(65) Prior Publication Data

US 2008/0172854 A1 Jul. 24, 2008

Related U.S. Application Data

(62) Division of application No. 11/231,853, filed on Sep. 22, 2005.

(30) Foreign Application Priority Data

Sep. 22, 2004 (JP) ............................ 2004-274623

(51) Int. Cl.
*B23P 17/00* (2006.01)

(52) U.S. Cl. ....................................... 29/890.1; 72/325

(58) Field of Classification Search .................. 347/68, 347/70, 71, 72; 29/890.1, 428; 72/325, 379.2, 72/379.6

See application file for complete search history.

(56) References Cited

U.S. PATENT DOCUMENTS

| | | | | |
|---|---|---|---|---|
| 5,189,437 | A * | 2/1993 | Michaelis et al. | 347/47 |
| 5,408,739 | A * | 4/1995 | Altavela et al. | 29/611 |
| 5,548,894 | A * | 8/1996 | Muto | 29/890.1 |
| 5,761,783 | A * | 6/1998 | Osawa et al. | 29/25.35 |
| 5,781,994 | A * | 7/1998 | Fouillet et al. | 29/890.1 |
| 5,809,646 | A * | 9/1998 | Reinecke et al. | 29/890.1 |
| 6,176,012 | B1 * | 1/2001 | Ishimatsu | 29/890.1 |
| 6,732,414 | B2 * | 5/2004 | Kitahara | 29/25.35 |
| 6,896,361 | B2 * | 5/2005 | Sugiyama | 347/71 |
| 6,975,466 | B2 * | 12/2005 | Umeyama et al. | 359/896 |

(Continued)

FOREIGN PATENT DOCUMENTS

JP 05-164290 A 6/1993

(Continued)

*Primary Examiner*—Essama Omgba
(74) *Attorney, Agent, or Firm*—Sughrue Mion, PLLC

(57) ABSTRACT

A method of fabricating a liquid ejection head is provided. The method includes preparing a first die including projected streak portions aligned in parallel by a predetermined pitch and gap portions formed between the adjacent projected streak portions. The first die is adapted to form groove-like recess portions by pressing the projected streak portions to a metal plate. The method further includes preparing a second die for supporting the metal plate to which the projected streak portions of the first die are pressed. Each of the projected streak portions includes: an inner wall forming portion for forming an inner wall of the corresponding groove-like recess portion extending in a depth direction of the corresponding groove-like recess portion; a connecting face portion; and an inclined face portion, continuous via the connecting face portion to the inner wall forming portion, for forming a bottom portion of the corresponding groove-like recess portion into a substantially V-like shape.

1 Claim, 25 Drawing Sheets

U.S. PATENT DOCUMENTS 6,997,027 B2 * 2/2006 Akahane et al. ............... 72/325
7,018,023 B2 * 3/2006 Shimada ...................... 347/71
7,021,749 B2 * 4/2006 Akahane et al. ............... 347/68
7,028,377 B2 * 4/2006 Yasukawa et al. .......... 29/25.35
7,052,119 B2 * 5/2006 Akahane et al. ............... 347/71
7,086,154 B2 * 8/2006 Ito et al. .................... 29/890.1
7,100,415 B2 * 9/2006 Takashima et al. ............ 72/335
7,165,433 B2 * 1/2007 Akahane et al. ............... 72/335
7,194,886 B2 * 3/2007 Akahane et al. ............... 72/334
7,198,867 B2 * 4/2007 Sanders ................... 429/218.2
7,246,888 B2 * 7/2007 Akahane et al. ............... 347/71
7,249,484 B2 * 7/2007 Takashima et al. ............ 72/335
7,254,976 B2 * 8/2007 Takashima et al. ............ 72/335
7,387,373 B2 * 6/2008 Okazawa et al. .............. 347/70
7,543,381 B2 * 6/2009 Ogawa et al. .............. 29/890.1
2003/0121995 A1 * 7/2003 Akahane et al. ............. 239/548
2006/0055732 A1 * 3/2006 Ogawa et al. ................. 347/54
2006/0117829 A1 * 6/2006 Akahane et al. ............... 72/325
2006/0236536 A1 * 10/2006 Saito et al. ................. 29/890.1

FOREIGN PATENT DOCUMENTS

JP 2000-107948 A 4/2000
JP 2004-98166 A 4/2004

* cited by examiner

FIG. 12 (A)
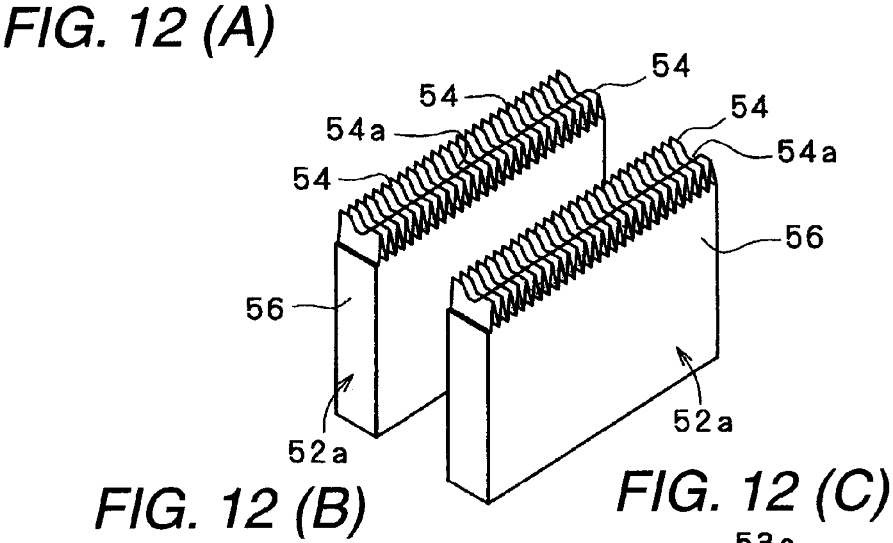
FIG. 12 (B)
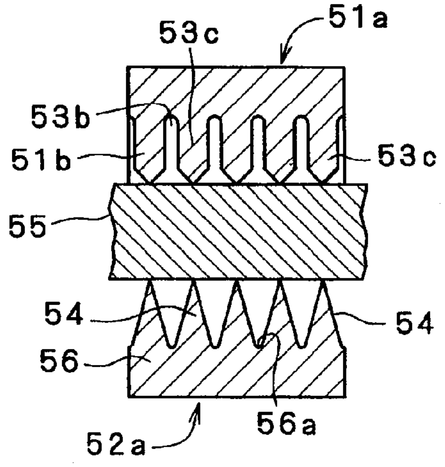
FIG. 12 (C)
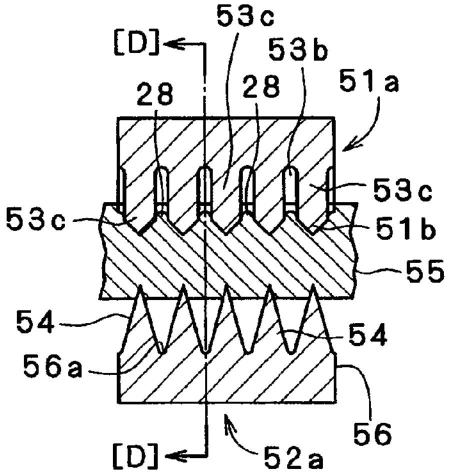
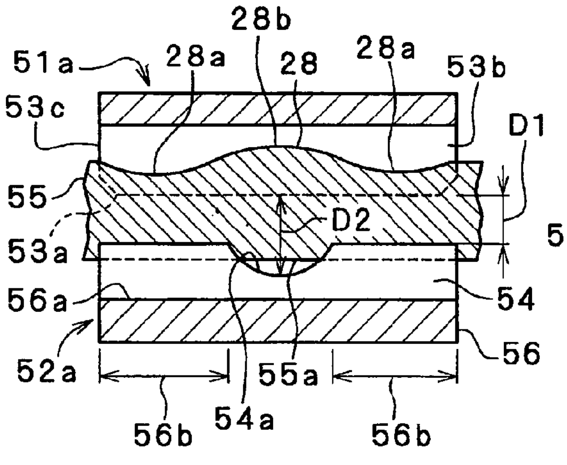
FIG. 12 (D)
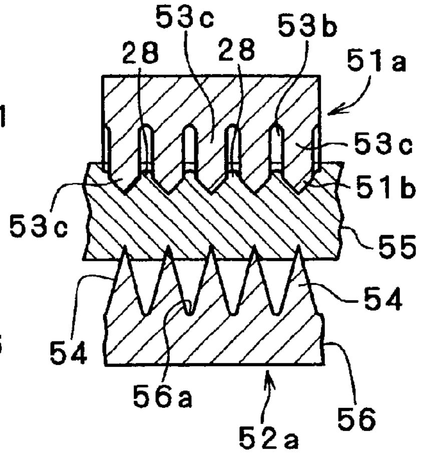
FIG. 12 (E)

APPARATUS OF FABRICATING AND METHOD OF FABRICATING LIQUID EJECTION HEAD, AND LIQUID EJECTION HEAD

CROSS-REFERENCE TO RELATED APPLICATIONS

This is a divisional of application Ser. No. 11/231,853 filed Sep. 22, 2005. Priority is claimed from JPA 2004-274623 filed Sep. 22, 2004. The entire disclosures of the prior application, application Ser. No. 11/231,853, and the above-identified priority documents, are hereby incorporated by reference.

BACKGROUND OF THE INVENTION

The present invention relates to an apparatus of fabricating and a method of fabricating a liquid ejection head and a liquid ejection head.

There are known liquid ejection heads each for ejecting a pressurized liquid from a nozzle opening as liquid drops constituting an object thereof by various liquids, and as a representative one among them, an ink jet type recording head can be pointed out. Hence, a background art will be explained by taking an example of the ink jet type recording head.

The ink jet type recording head (hereinafter, referred to as recording head) is provided with a plurality of a series of flow paths reaching nozzle openings from a common ink chamber via pressure generating chambers in correspondence with the nozzle openings. Further, in view of a request for small-sized formation, it is necessary to form the respective generating chambers by a fine pitch in correspondence with a recording density. Therefore, a wall thickness of a partition wall portion for partitioning the contiguous pressure generating chambers becomes extremely thin. Further, a flow path width of an ink supply port communicating the pressure generating chamber and the common ink chamber is further narrowed more than that of the pressure generating chamber in order to efficiently use an ink pressure in the pressure generating chamber for delivering ink drops.

Further, the pressure generating chamber is formed by subjecting a pressure generating chamber forming plate made of a metal to die pressing.

Further, a nozzle plate formed with the nozzle opening is fabricated by a metal plate in view of a request for workability or the like. Further, a diaphragm portion for changing a volume of the pressure generating chamber is formed by an elastic plate. The elastic plate is constituted by a double structure of pasting a resin film onto a support plate made of a metal and is fabricated by removing a portion of the support plate in correspondence with the pressure generating chamber.

Patent Reference 1: JP-A-2004-98166

Meanwhile, according to the recording head of the background art, in order to form the pressure generating chamber included therein, the pressure generating chamber forming plate made of a metal is subjected to pressing which is forging. In the pressing, when a shape of a die is not proper for a shape of a part to be worked, a worked surface is deteriorated. For example, in the case of forming a groove-like recess portion for forming the pressure generating chamber by pressing a die to a metal material plate, when there is an angular portion at a portion of the die, the angular portion is brought into a state of being strongly rubbed to the metal material plate and therefore, a surface portion of the metal material plate is brought into a state of being cut off and there is a concern of deteriorating a quality of finishing an inner face of the groove-like recess portion.

On the other hand, according to the recording head of the background art, the wall thickness of the partition wall portion is extremely thin and therefore, it is difficult to uniformly set a liquid containing volume of the pressure generating chamber or the like by accurately providing a recess shape of the pressure generating chamber. The recess shape is generally constituted by a slender shape frequently, a length of the partition wall portion is prolonged by that amount and therefore, it is important to accurately fabricate the partition wall portion over an entire length thereof in view from uniformly ensuring the liquid containing volume. Particularly, in order to provide the recess shape in a proper shape, it is regarded to be important to sufficiently ensure a height of the partition wall portion between the recess shapes at a fabrication stage.

SUMMARY OF THE INVENTION

The invention has been carried out in order to resolve the problem and it is an object thereof to provide an apparatus of fabricating and a method of fabricating a liquid ejection head and a liquid ejection head capable of smoothly finishing an inner face of a groove-like recess portion for forming a pressure generating chamber.

Means for Solving the Problems

In order to achieve the above-described object, an apparatus of fabricating a liquid ejection head according to the invention constitutes a gist thereof by an apparatus of fabricating a liquid ejection head constituted by including a pressure generating chamber forming plate made of a metal aligned with a groove-like recess portion for constituting a pressure generating chamber and formed with a communication port penetrated in a plate thickness direction at one end of each groove-like recess portion, a nozzle plate bored with a nozzle opening at a position in correspondence with the communication port, and a sealing plate made of a metal for sealing an opening face of the groove-like recess portion and bonding the sealing plate to a side of the groove-like recess portion of the pressure generating chamber forming plate and bonding the nozzle plate on a side opposed thereto, respectively, wherein the apparatus is constituted by including a first die at least provided with projected streak portions aligned in parallel by a predetermined pitch and a gap portion formed between the respective projected streak portions for forming the groove-like recess portion by pressing the projected streak portion to a metal material plate, and a second die for supporting the metal material plate pressed with the first die, the projected portion is provided with an inner wall forming portion of forming an inner wall in a depth direction of the groove-like recess portion, and an inclined face portion formed by recessing a bottom portion of the groove-like recess portion substantially in a V-like shape continuously to the inner wall forming portion and is provided with a connecting face portion for connecting the inner wall forming portion and the inclined face portion.

Further, in order to achieve the above-described object, a method of fabricating a liquid ejection head according to the invention constitutes a gist thereof by a method of fabricating a liquid ejection head constituted by including a pressure generating chamber forming plate made of a metal aligned with a groove-like recess portion for constituting a pressure generating chamber and formed with a communication port penetrated in a plate thickness direction at one end of each groove-like recess portion, a nozzle plate bored with a nozzle opening at a position in correspondence with the communication port and a sealing plate made of a metal for sealing an opening face of the groove-like recess portion and bonding the sealing plate to a side of the groove-like recess portion of the pressure generating chamber forming plate and bonding the nozzle plate to a side thereof opposed thereto, respectively, wherein a first die at least provided with projected streak portions aligned in parallel by a predetermined pitch and a gap portion formed between the respective projected streak portions for forming the groove-like recess portion by pressing the projected streak portion to a metal material plate, and a second die for supporting the metal material plate pressed with the first die are prepared, and the projected streak portion provided with an inner wall forming portion of forming an inner wall in a depth direction of the groove-like recess portion, and an inclined face portion for recessing to form a bottom portion of the groove-like recess portion substantially in a V-like shape continuously to the inner wall forming portion and provided with a connecting face portion for connecting the inner wall forming portion and the inclined face portion is pressed to the metal material plate.

Further, in order to achieve the above-described object, a liquid ejection head according to the invention constitutes a gist thereof by a liquid ejection head constituted by including a pressure generating chamber forming plate made of a metal aligned with a groove-like recess portion for constituting a pressure generating chamber and formed with a communication port penetrated in a plate thickness direction at one end of each groove-like recess portion, a nozzle plate bored with a nozzle opening at a position in correspondence with the communication port, and a sealing plate made of a metal for sealing an opening face of the groove-like recess portion and bonding the sealing plate to a side of the groove-like recess portion of the pressure generating chamber forming plate and bonding the nozzle plate to a side opposed thereto, respectively, wherein the groove-like recess portion is provided with an inner wall formed in a depth direction, a bottom portion recessed to form substantially in a V-like shape and a continuous face for making the inner wall and the bottom portion continuous in a smooth face state.

That is, according to the apparatus of fabricating a liquid ejection head of the invention, the projected streak portion is provided with the inner wall forming portion for forming the inner wall in the depth direction of the groove-like recess portion and the inclined face portion for recessing to form the bottom portion of the groove-like recess portion substantially in the V-like shape continuous to the inner wall forming portion and is provided with the connecting face portion for connecting the inner wall forming portion and the inclined face portion. Therefore, when the projected streak portion is pressed to the metal material plate, a large amount of a metal material is pressed to be divided by the inclined face portion disposed at a front end portion thereof, however, a flowing amount of the metal pressed to be divided is reduced at the connecting face portion. Therefore, a compression force, a shear force or the like received by the metal material is reduced at the connecting face portion, and a phenomenon of cutting off the metal material is not brought about. By the flow phenomenon of the metal material, the normal recesses and projections, a scratch mark in the direction of pressing the projected streak portion or the like is not produced at an inner face of the groove-like recess portion. Further, the fluidity of the metal material is smoothly achieved by the connecting face portion and therefore, a material is promoted to move to the gap portion formed between the respective projected streak portions, and the partition wall portion formed at the gap portion can be formed by a sufficient height. Further, a volume of the groove-like recess portion is not considerably reduced by installing the connecting face portion and therefore, a hindrance is not brought about in a liquid ejection amount of the liquid ejection head.

In the apparatus of fabricating a liquid ejection head according to the invention, when a triangle formed by an intersecting portion at which an extended face of the inner wall forming portion and an extended face of the inclined face portion are intersected, an inner wall forming portion side end portion of the connecting face portion, and an inclined face portion side end portion of the connecting face portion is constituted by a shape of substantially an isosceles constituting a base thereof by the connecting face portion on an imaginary section orthogonal to a longitudinal direction of the projected streak portion, the compression force, the shear force or the like received by the metal material can be minimized at the connecting face portion. On the other hand, when the mode of the substantially isosceles is changed, the connecting face portion constituting the base is moved to an erected side or a lying side. When moved to the erected side, a corner portion reducing an angle of intersecting the inclined face portion and the connecting face portion is formed and the above-described abnormal inner face is produced. Further, when moved to the lying side, a corner portion reducing an angle of intersecting the inner wall forming portion and the connecting face portion is formed and the above-described abnormal inner face is produced. Therefore, by maintaining substantially the isosceles, the corner portion at which the intersecting angles are not excessively reduced can be formed and therefore, the problem of the abnormal inner face is resolved.

In the apparatus of fabricating a liquid ejection head of the invention, when an included angle made by a direction of pressing the projected streak portion and the connecting face portion is 8 through 40 degrees, a state of inclining the connecting face portion can properly be set and occurrence of the abnormal inner face can firmly be prevented. In the apparatus of fabricating a liquid ejection head of the invention, when an included angle made by the direction of pressing the projected streak portion and the inclined face portion is 40 through 50 degrees, the metal material is made to flow with excellent fluidity by pressing the projected streak portion to the metal material plate. Further, the angle of intersecting the inclined face portion and the connecting face portion does not become abnormarily small and therefore, an adverse effect by the corner portion does not appear.

In the apparatus of fabricating a liquid ejection head of the invention, when a dimension in a width direction of the projected streak portion between the inclined face portion side end portion of the connecting face portion and the inner wall forming portion is constituted by a ratio of 0.05 through 0.15 relative to a width dimension of the projected streak portion, a length of the inclined face portion can be made to be proper, and an amount of moving the metal when a large amount of the metal material is pressed to be divided by the inclined face portion disposed at the front end portion can be controlled not to be excessively large or excessively small relative to a flow amount of the metal at the connecting face portion. Thereby, the problem of the abnormal inner face or the like is resolved.

In the apparatus of fabricating a liquid ejection head of the invention, when the dimension in the width direction of the projected streak portion between the inclined face portion side end portion of the connecting face portion and the inner wall forming portion is constituted by a ratio of 0.06 through 0.45 relative to a width dimension of the gap portion, a length of the inclined face portion can be made to be proper, and an amount of moving the metal when a large amount of the metal material is pressed to be divided by the inclined face portion disposed at the front end portion can be controlled not to be excessively large or excessively small relative to the front flow amount of the metal at the connecting face portion. Thereby, the problem of the abnormal inner face or the like is resolved.

In the apparatus of fabricating a liquid ejection head of the invention, when the connecting face portion is a plane, boundary portions of the connecting face portion and the inclined face portion and the inner wall face portion are made to be easy to determine, and a size and a degree of inclining the connecting face portion can accurately be set. In the apparatus of fabricating a liquid ejection head of the invention, when the connecting face portion is a curved face, boundary portions of the curved face and the inclined face portion and the inner wall forming portion are made to be continuous smoothly and therefore, the fluidity of the metal material can be made to be smooth. Further, a reduction in the volume of the groove-like recess portion can be minimized.

Further, according to the method of fabricating a liquid ejection head of the invention, the projected streak portion provided with the inner wall forming portion for forming the inner wall in the depth direction of the groove-like recess portion and the inclined face portion for recessing to from the bottom portion of the groove-like recess portion substantially in the V-like shape continuously to the inner wall forming portion and provided with the connecting face portion for connecting the inner wall forming portion and the inclined face portion is pressed to the metal material plate. Therefore, when the projected streak portion is pressed to the metal material plate, although a large amount of the metal material is pressed to be divided by the inclined face portion disposed at the front end portion, the flow amount of the metal pressed to be divided is reduced at the connecting face portion. Therefore, the compression force, the shear force or the like received by the metal material is reduced at the connecting face portion, and the phenomenon of cutting off the metal material is not brought about. By the flow phenomenon of the metal material, abnormal recesses and projections, a scratch mark in the direction of pressing the projected streak portion or the like is not produced at the inner face of the groove-like recess portion. Further, the fluidity of the metal material is smoothly achieved by the connecting face portion and therefore, the material is promoted to move to the gap portion formed between the respective projected portions and the partition wall portion formed at the gap portion can be formed by a sufficient height. Further, the volume of the groove-like recess portion is not considerably reduced by installing the connecting face portion and therefore, a hindrance is not brought about in a liquid ejection amount of the liquid ejection head.

Further, according to the liquid ejection head of the invention, the groove-like recess portion is provided with the inner wall formed in the depth direction, the bottom portion formed by being recessed substantially in the V-like shape and the continuous face at which the inner wall and the bottom portion are made to be continuous in a smooth face state. Therefore, a rigidity of a root portion of the partition wall portion formed between the respective groove-like recess portions is promoted by the continuous face and therefore, so-to-speak cross talk in which a pressure variation of a fluid in the pressure generating chamber effects an influence on other pressure generating chamber can be avoided. Further, since the inner face of the pressure generating chamber is smooth, air bubbles mixed in the liquid are not caught by the inner face, which is preferable for discharging air bubbles.

The present disclosure relates to the subject matter contained in Japanese patent application No. 2004-274623 (filed on Sep. 22, 2004), which is expressly incorporated herein by reference in its entirety.

BRIEF DESCRIPTION OF THE DRAWINGS

FIG. 12 illustrates a perspective view and sectional views showing a state of progressing tentative forming.

DESCRIPTION OF THE PREFERRED EMBODIMENT

An explanation will be given of the best mode for embodying an apparatus of fabricating and a method of fabricating a liquid ejection head and a liquid ejection head according to the invention as follows.

A liquid ejection head constituting an object of fabrication according to the invention can be made to function by constituting an object by various liquids as described above and in an illustrated embodiment, as a representative case, there is shown an example for applying the liquid ejection head to an ink jet type recording head.

Embodiment 1

Figure 1:
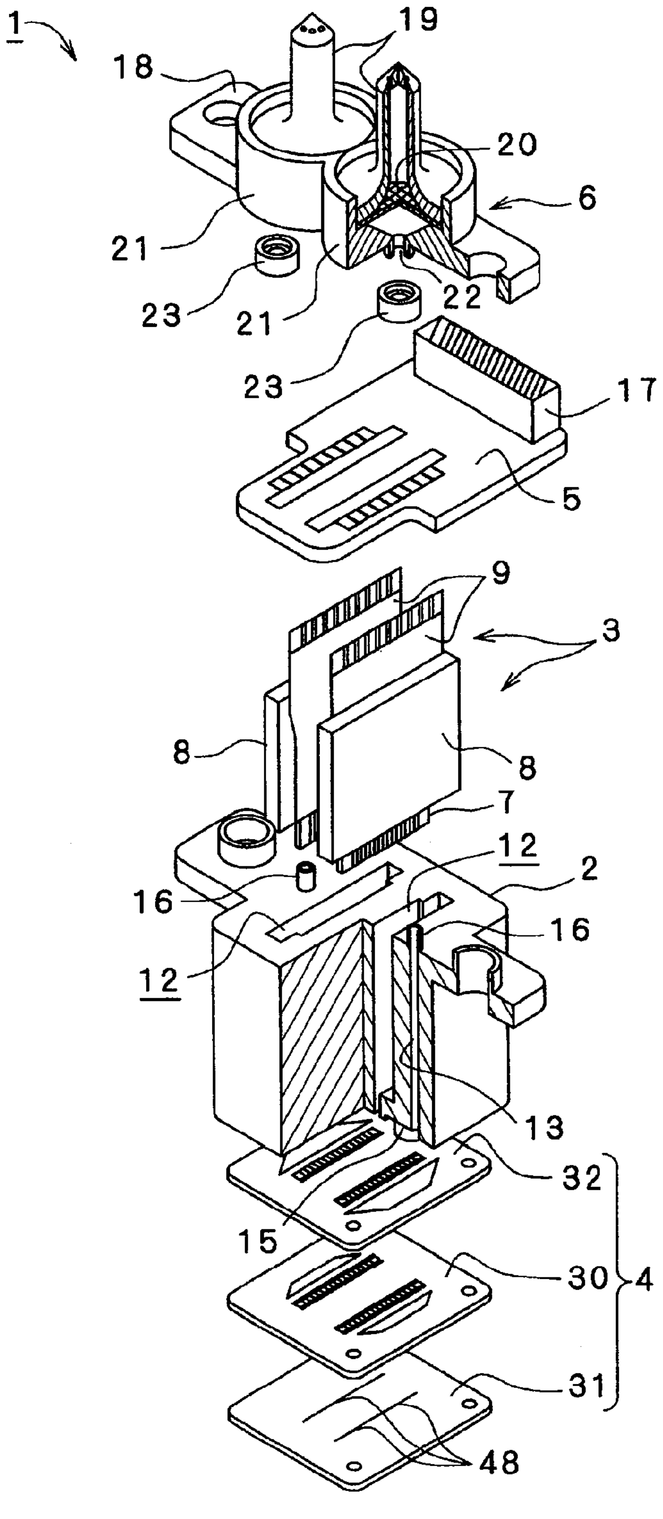
FIG. 1 is a disassembled perspective view of an ink jet type recording head
Figure 2:
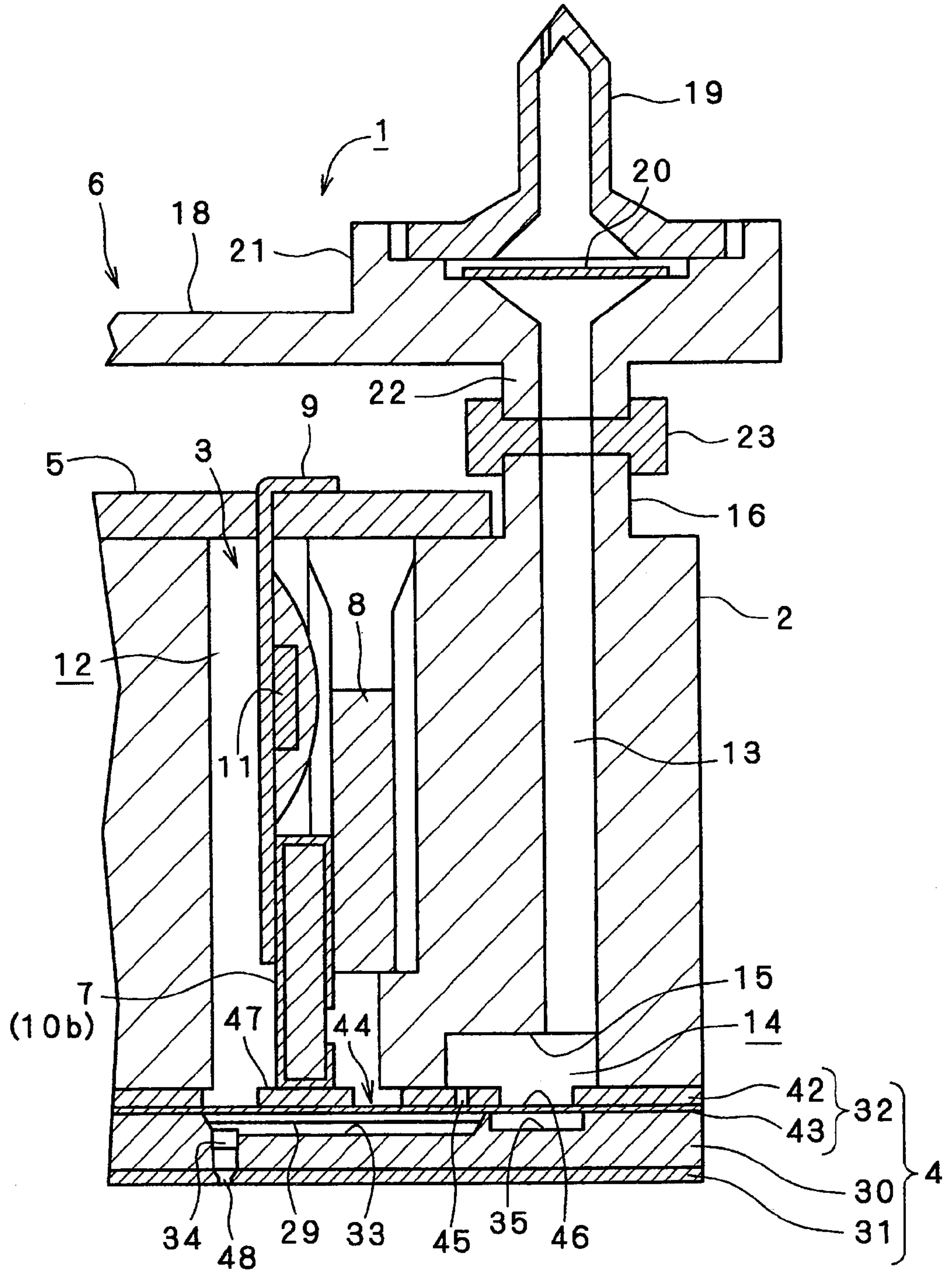
FIG. 2 is a sectional view of the ink jet type recording head.

As shown by FIG. 1 and FIG. 2, a recording head 1 is substantially constituted by a case 2, an oscillator unit 3 contained in the case 2, a flow path unit 4 bonded to a front end face of the case 2, a connection board 5 arranged on an attaching face of the case 2 on a side opposed to the front end face, a supply needle unit 6 attached to a side of the attaching face of the case 2 and the like.

Figure 3:
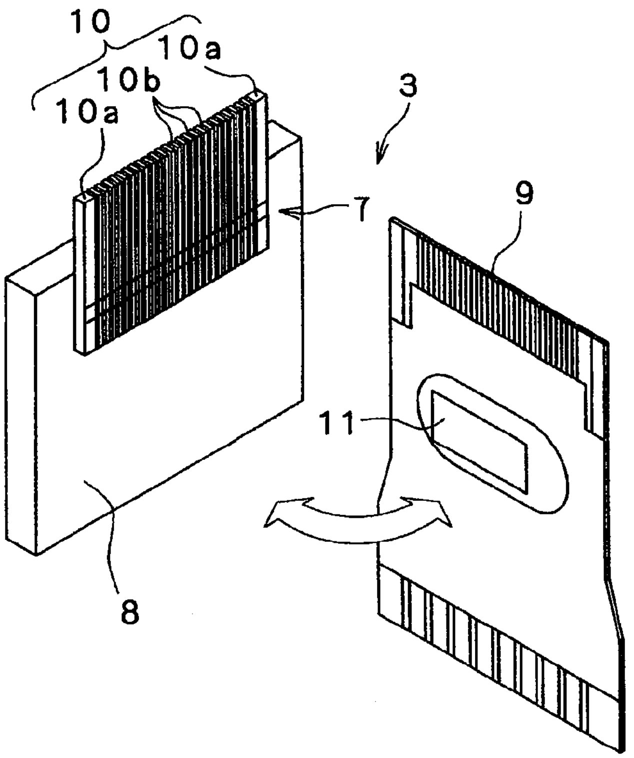
FIGS. 3(A) and (B) are views for explaining an oscillator unit.
Figure 3:
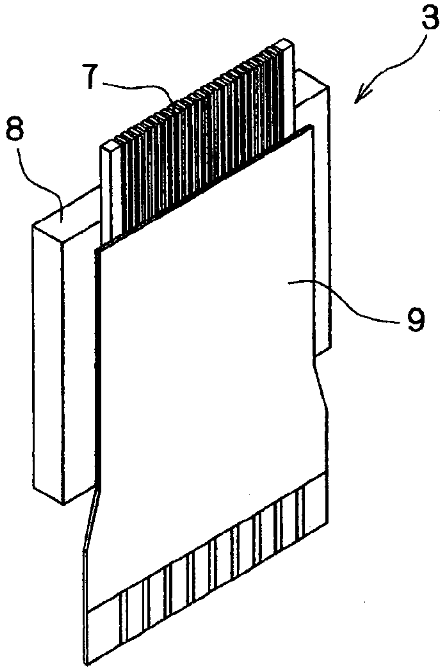

As shown FIG. 3, the oscillator unit 3 is substantially constituted by a piezoelectric oscillator group 7, a fixed plate 8 bonded with the piezoelectric oscillator group 7, and a flexible cable 9 for supplying a drive signal to the piezoelectric oscillator group 7.

The piezoelectric oscillator group 7 is provided with a plurality of piezoelectric oscillators 10 . . . formed in a row-like shape. The respective piezoelectric oscillators 10 . . . are a kind of pressure generating elements and are also a kind of electromechanical conversion elements. The respective electric oscillators 10 . . . are constituted by a pair of dummy oscillators 10*a*, 10*a* disposed at both ends of the row and a plurality of driving oscillators 10*b* . . . arranged between the dummy oscillators 10*a*, 10*a*. Further, the respective driving oscillators 10*b* are cut to be divided in a combteeth-like shape having an extremely slender width of, for example, about 50 μm through 100 μm and provided by 180 pieces. Further, the dummy oscillator 10*a* is provided with a width sufficiently larger than that of the driving oscillators 10*b* and is provided with a protecting function for protecting the driving oscillator 10*b* against impact or the like and a guiding function for disposing the oscillator units 3 at predetermined positions.

According to the respective piezoelectric oscillators 10 . . . , free end portions thereof are projected to a side outward from a front end face of the fixed plate 8 by bonding fixed end portions thereof onto the fixed plate 8. That is, the respective piezoelectric oscillators 10 . . . are supported on the fixed plate 8 in a so-to-speak cantilever state. Further, the free end portions of the respective piezoelectric oscillators 10 . . . are constituted by alternately laminating piezoelectric members and inner electrodes and are elongated and contracted in a longitudinal direction of the elements by applying a potential difference between the electrodes opposed to each other.

The flexible cable 9 is electrically connected to the piezoelectric oscillators 10 at side faces of fixed end portions thereof constituting a side opposed to the fixed plate 8. Further, a surface of the flexible cable 9 is mounted with a controlling IC 11 for controlling to drive the piezoelectric oscillators 10. Further, the fixed plate 8 for supporting the respective piezoelectric oscillators 10 . . . is a plate-like member having a rigidity capable of receiving a reaction force from the piezoelectric oscillator 10 and a metal plate of a stainless steel plate or the like is preferably used therefor.

The case 2 is a block-like member molded by a thermoplastic resin of, for example, epoxy species resin or the like. Here, the reason of molding the case 2 by a thermoplastic resin is that the thermoplastic resin is provided with a mechanical strength higher than that of a general resin, a linear expansion coefficient thereof is smaller than that of a general resin and deformation by a change in a temperature of a surrounding is smaller. Further, inside of the case 2 is formed with a containing hollow portion 12 capable of containing the oscillators unit 3, and an ink supply path 13 constituting a portion of a flow path of ink. Further, a front end face of the case 2 is formed by a front end recess portion 15 for constituting a common ink chamber (reservoir) 14.

The containing hollow portion 12 is a hollow portion having a size capable of containing the oscillator unit 3. At a portion on a front end side of the containing hollow portion 12, an inner wall of the case is partially projected to direct in a side direction and an upper face of the projected portion functions as a face in contact with the fixed plate. Further, the oscillator unit 3 is contained in the containing hollow portion 12 in a state of facing front ends of the respective piezoelectric oscillators 10 from an opening thereof. In the containing state, a front end face of the fixed plate 8 is adhered thereto in a state of being brought into contact with the face in contact with the fixed plate.

A front end recess portion 15 is fabricated by partially recessing a front end face of the case 2. The front end recess portion 15 of the embodiment is a recess portion substantially in a trapezoidal shape formed on left and right outer sides of the containing hollow portion 12 and is formed such that a lower bottom of the trapezoid is disposed on a side of the containing hollow portion 12.

The ink supply path 13 is formed to penetrate in a height direction of the case 2 and a front end thereof is communicated with an ink storing chamber 14, mentioned later. Further, an end portion of the ink supply path 13 on a side of the attaching face is formed in a connection port 16 projected from the attaching face.

The connection board 5 is a wiring board formed with electric wirings for various signals supplied to the recording head 1 and attached with a connector 17 capable of connecting a signal cable. Further, the connection board 5 is arranged on the attaching face of the case 2 and is connected with an electric wiring of the flexible cable 9 by soldering or the like. Further, the connector 17 is inserted with a front end of a signal cable from a control apparatus (not illustrated).

The supply needle unit 6 is a portion connected with an ink cartridge (not illustrated) and is substantially constituted by a needle holder 18, an ink supply needle 19, and a filter 20.

The ink supply needle 19 is a potion inserted into the ink cartridge for introducing ink stored in the ink cartridge. A front end portion of the ink supply needle 19 is sharpened in a conical shape to facilitate to insert into the ink cartridge. Further, the front end portion is bored with a plurality of ink introducing holes for communicating inside and outside of the ink supply needle 19. Further, the recording head 1 of the embodiment can eject two kinds of inks and therefore, the recording head 1 is provided with two pieces of the ink supply needles 19.

The needle holder 18 is a member for attaching the ink supply needle 19 and a surface thereof is formed with two pieces of base seats 21 for fixedly attaching root portions of the ink supply needles 19 to align transversely. Further, a substantial center of a seat bottom face is formed with an ink discharge port 22 penetrated in a plate thickness direction of the needle holder 18. Further, a flange portion is extended in a side direction in the needle holder 18.

The filter 20 is a member for hampering a foreign matter in ink of dust, burrs in molding or the like from passing and is constituted by, for example, a metal net having a fine mesh. The filter 20 is adhered to a filter holding groove formed in the base seat 21.

Further, as shown by FIG. 2, the supply needle unit 6 is arranged on the attaching face of the case 2. In the arranged state, the ink discharge port 22 of the supply needle unit 6 and the connection port 16 of the case 2 are communicated in a liquid tight state via a packing 23.

Next, the flow path unit 4 will be explained. The flow path unit 4 is constituted to bond a nozzle plate 31 to one face of a pressure generating chamber forming plate 30 and bond an elastic plate 32 to other face of the pressure generating chamber 30.

Figure 4:
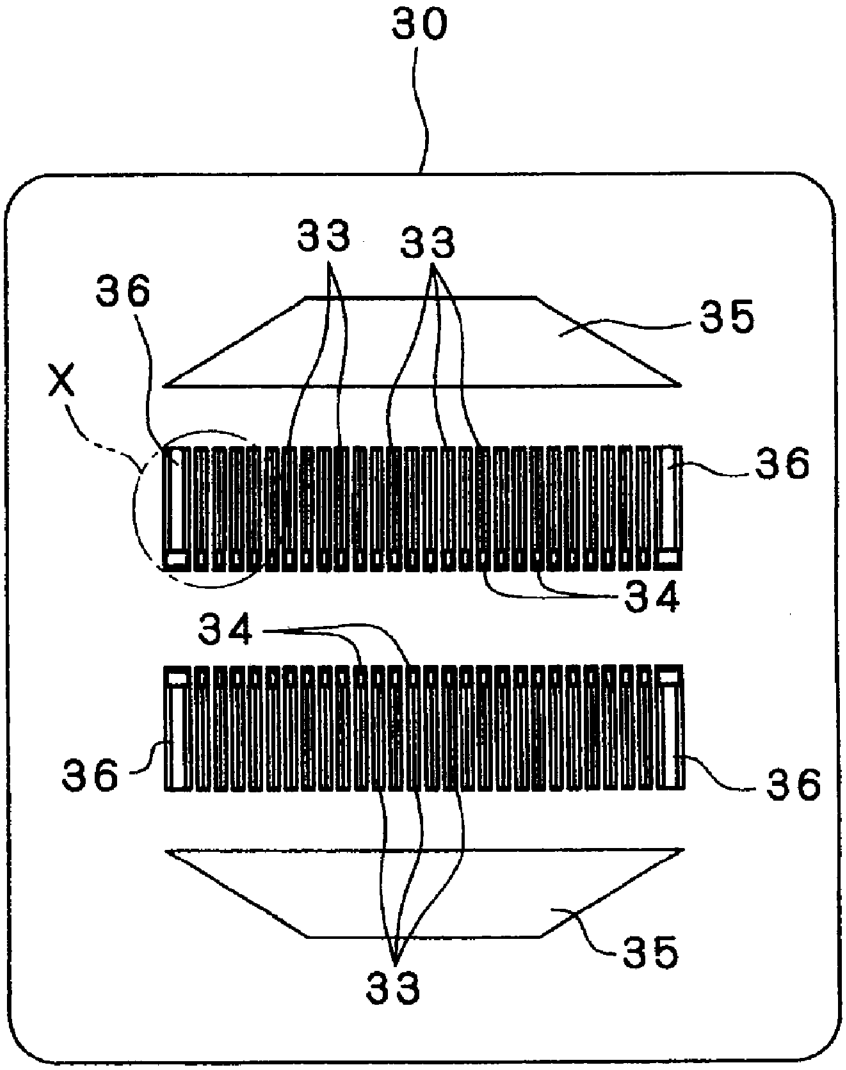
FIG. 4 is a plane view of a pressure generating chamber forming plate.

As shown by FIG. 4, the pressure generating chamber forming plate 30 is a plate-like member made of a metal formed with a groove-like recess portion 33, a communication port 34 and an escape recess portion 35. According to the embodiment, the pressure generating chamber forming plate 30 is fabricated by working a base plate made of nickel having a thickness of 0.35 mm.

Here, reason of selecting nickel as the board will be explained. First reason is that a linear expansion coefficient of nickel is substantially equal to a linear expansion coefficient of a metal constituting principal portions of the nozzle plate 31 and the elastic plate 32. That is, when linear expansion coefficients of the pressure generating chamber forming plate 30, the elastic plate 32 and the nozzle plate 31 constituting the flow path unit 4 are equal, in the case in which the respective members are heated to adhere, the respective members are uniformly expanded. Therefore, it is difficult to generate mechanical stresses of warp or the like caused by a difference in the expansion coefficients. As a result, the respective members can be adhered without a hindrance even when an adhering temperature is set to a high temperature. Further, even when the piezoelectric oscillators 10 generate heat in operating the recording head 1 and the flow path unit 4 is heated by the heat, the respective members 30, 31, 32 constituting the flow path unit 4 are uniformly expanded. Therefore, even when heating by operating the recording head 1 and cooling by stopping to operate the recording head 1 are repeatedly carried out, it is difficult to bring about a drawback of exfoliation or the like in the respective members 30, 31, 32 constituting the flow path unit 4.

A second reason is that nickel is excellent in rust resistance. That is, in the recording head 1 of this kind, an aqueous ink is preferably used and therefore, it is important that denaturing of rust or the like is not brought about even when brought into contact with water over a long period of time. In this respect, nickel is excellent in rust resistance similar to stainless steel and it is difficult to be denatured such as rust or the like.

A third reason is that nickel is rich in malleability. That is, in fabricating the pressure generating chamber forming plate 30, the pressure generating chamber forming plate 30 is fabricated by plastic deformation (for example, pressing) as mentioned later according to the embodiment. Further, the groove-like recess portion 33 and the communication port 34 formed at the pressure generating chamber forming plate 30 are constituted by extremely small shapes and a high dimensional accuracy is requested therefor. Further, when nickel is used for the board, the groove-like recess portion 33 and the communication port 34 can be formed with a high dimensional accuracy even by plastic deformation since nickel is rich in malleability.

Further, the pressure generating chamber forming plate 30 may be constituted by a metal other than nickel so far as the above-described respective conditions, that is, the condition of the linear expansion coefficient, the condition of the rust resistance and the condition of the malleability are satisfied.

Figure 5:
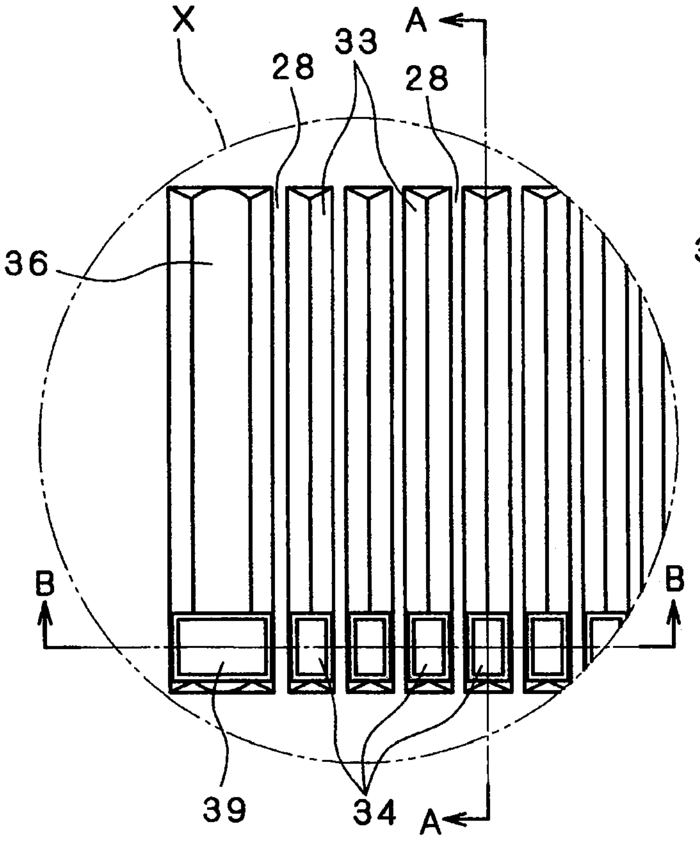
FIG. 5 illustrates explanatory views of the pressure generating chamber forming plate, FIG. 5(*a*) is a view enlarging portion X in FIG. 4, FIG. 5(*b*) is a sectional view taken along a line A-A of FIG. 5(*a*), and FIG. 5(*c*) is a sectional view taken along a line B-B of FIG. 5(*a*).
Figure 5:
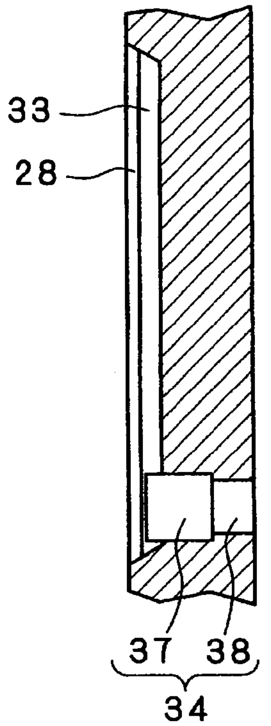
Figure 5:
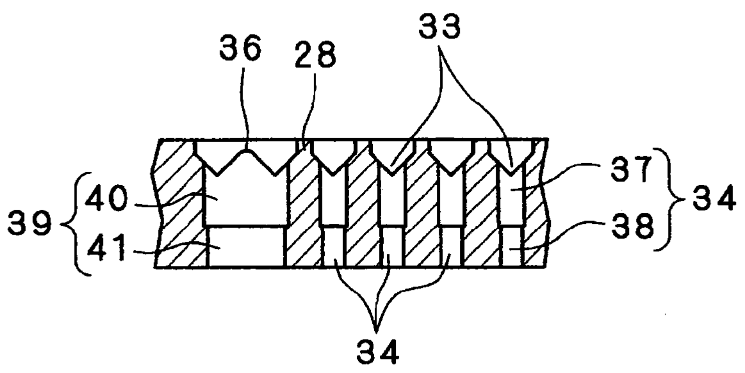

The groove-like recess portion 33 is a recess portion in a shape of a groove for constituting a pressure generating chamber 29, and is constituted by a groove in a linear shape as shown by FIG. 5 by enlarging the groove. According to the embodiment, 180 pieces of grooves of a width of about 0.1 mm, a length of about 1.5 mm, and a depth of about 0.1 mm are aligned in a groove width direction. A width of a bottom face of the groove-like recess portion 33 is contracted to be recessed in a V-like shape as proceeding in a depth direction (that is, depth side). The bottom face is recessed in the V-like shape to promote a rigidity of a partition wall portion 28 for partitioning the pressure generating chambers 29, 29 contiguous to each other. That is, by recessing the bottom face in the V-like shape, a wall thickness of a root portion (portion on bottom face side) of the partition wall portion 28 is thickened and the rigidity of the partition wall portion 28 is promoted. Further, when the rigidity of the partition wall portion 28 is promoted, an influence of a pressure variation from the contiguous pressure generating chamber 29 is difficult to be effected. That is, the variation in the ink pressure from the contiguous pressure generating chamber 29 is difficult to be transmitted. Further, by recessing the bottom face in the V-like shape, the groove-like recess portion 33 can be formed by plastic deformation with an excellent dimensional accuracy (mentioned later). Further, although an angle of the character V is rectified by a working condition, the angle is, for example, around 90 degrees. Further, since the wall thickness of a front end portion of the partition wall portion 28 is extremely thin, even when the pressure generating chambers 29 are densely formed, a necessary volume can be ensured.

Further, with regard to the groove-like recess portion 33 according to the embodiment, both end portions in a longitudinal direction thereof are inclined downward to an inner side as proceeding to the depth side. That is, the both end portions in the longitudinal direction of the groove-like recess portion 33 is formed in a faced shape. Because by constituting in this way, the groove-like recess portion 33 is formed with an excellent dimensional accuracy by plastic deformation.

Further, ones of the dummy recess portions 36 having a width wider than that of the groove-like recess portion 33 are formed contiguously to the groove-like recess portions 33, 33 at the both end portions. The dummy recess portion 36 is a recess portion in a groove-like shape for constituting a dummy pressure generating chamber which does not relate to ejection of ink drops. The dummy recess portion 36 according to the embodiment is constituted by a groove having a width of about 0.2 mm, a length of about 1.5 mm, and a depth of about 0.1 mm. Further, a bottom face of the dummy recess portion 36 is recessed in a W-like shape. This is for promoting the rigidity of the partition wall portion 28 and forming the dummy recess portion 36 by plastic deformation with an excellent dimensional accuracy.

Further, a row 33*a* of a recess portion in a groove-like shape is constituted by the respective groove-like recess portions 33 . . . and the pair of dummy recess portions 36, 36. According to the embodiment, two rows of the rows 33*a* are formed transversely.

A communication port 34 is formed as a through hole penetrated from one end of the groove-like recess portion 33 in a plate thickness direction. The communication port 34 is formed for each groove-like recess portion 33 and a single recess portion row is formed with 180 pieces thereof. According to the communication port 34 of the embodiment, a shape of an opening thereof is constituted by a rectangular shape and is constituted by a first communication port 37 formed from a side of the groove-like recess portion 33 of the pressure generating chamber forming plate 30 to a middle thereof in a plate thickness direction, and a second communication port 38 formed from a surface thereof on a side opposed to the groove-like recess portion 33 to the middle in the plate thickness direction. The first communication port 37 is formed as a bottomed recess portion, a bottomed recess portion constituting the second communication port 38 is formed at a bottom portion of the recess portion, and the bottom portion appears as a bulged portion at a surface on a side opposed to the groove-recess portion 33. The second communication port 38 is opened by cutting off the bulged portion by polishing or the like.

Further, sectional areas of the first communication port 37 and the second communication port 38 differ from each other, and an inner dimension of the second communication port 38 is set to be slightly smaller than an inner dimension of the first communication port 37. This is owing to the fact that the communication port 34 is fabricated by pressing. That is, the pressure generating chamber forming plate 30 is fabricated by working a nickel plate having a thickness of 0.35 mm and therefore, a length of the communication port 34 becomes equal to or larger than 0.25 mm even subtracting the depth of the groove-like recess portion 33. Further, the width of the communication port 34 is set to be less than 0.1 mm since it is necessary to make the width narrower than the groove width of the groove-like recess portion 33. Therefore, when the communication port 34 is going to be punched by one time working, a male die (punch) is buckled in view of a relationship with an aspect ratio. Hence, according to the embodiment, working is divided to two times, in the first working, the first communication port 37 is formed up to the middle in the plate thickness direction and in the second working, the second communication port 38 is formed. Further, a working procedure of the communication port 34 will be explained later.

Further, the dummy recess portion 36 is formed with a dummy communication port 39. Similar to the communication port 34, the dummy communication port 39 is constituted by a first dummy communication port 40 and a second dummy communication port 41 and an inner dimension of the second dummy communication port 41 is set to be smaller than an inner dimension of the first dummy communication port 40.

Further, although according to the embodiment, the communication port 34 and the dummy communication port 39 the opening shape of which is constituted by the rectangular through hole are exemplified, the shape is not limited to the rectangular shape. Further, the opening shape may be constituted by a through hole opened in a circular shape.

The escaping recess portion 35 forms a space for working a compliance portion in the common ink chamber 14. According to the embodiment, the escaping recess portion 35 is constituted by a recess portion in a trapezoidal shape of a shape substantially the same as that of the front end recess portion 15 of the case 2 and having a depth equal to that of the groove-recess portion 33.

Next, the elastic plate 32 will be explained. The elastic plate 32 is a kind of a sealing plate and is fabricated by a composite material (a kind of a metal material of the invention) of a double structure laminating an elastic film 43 on a support plate 42. According to the embodiment, a stainless steel plate is used as the support plate 42 and PPS (polyphenylene sulfide) is used as the elastic film 43.

Figure 6:
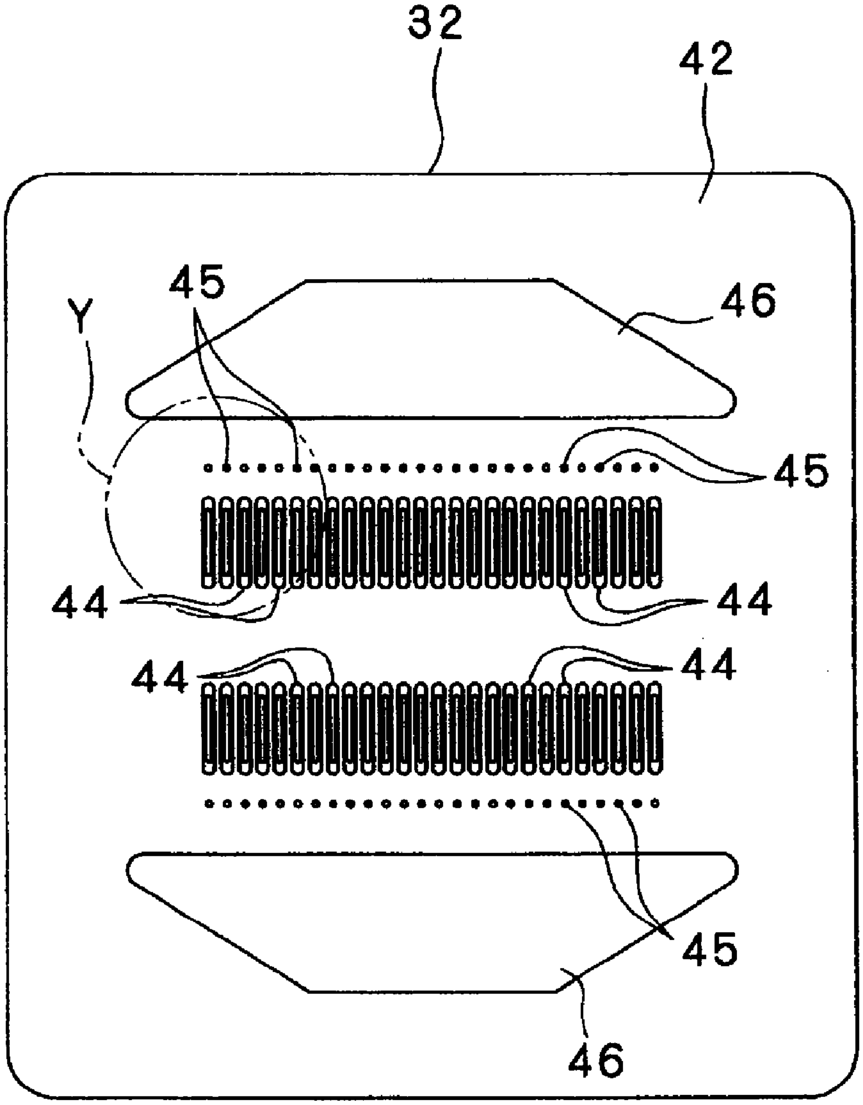
FIG. 6 is a plane view of an elastic plate.

As shown by FIG. 6, the elastic plate 32 is formed with a diaphragm portion 44, an ink supply port 45 and a compliance portion 46.

Figure 7:
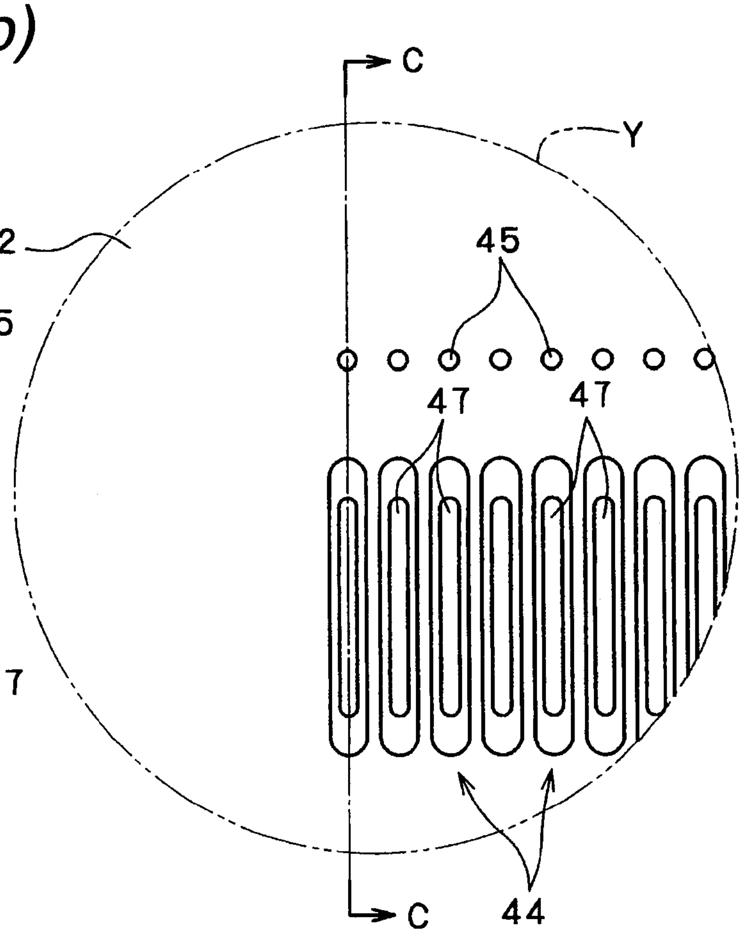
FIG. 7 illustrates explanatory views of the elastic plate, FIG. 7(*a*) is a view enlarging portion Y of FIG. 6, FIG. 7(*b*) is a sectional view taken along a line C-C of FIG. 7(*a*).
Figure 7:
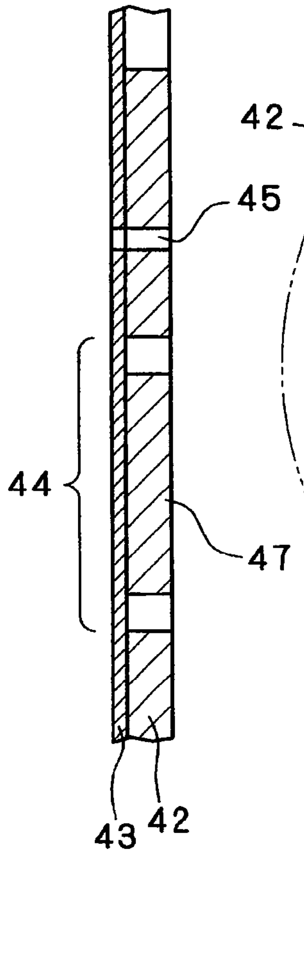

The diaphragm portion 44 is a portion of partitioning a portion of the pressure generating chamber 29. That is, the diaphragm portion 44 seals an opening face of the groove-like recess portion 33 and partition to form the pressure generating chamber 29 along with the groove-like recess portion 33. As shown by FIG. 7(*a*), the diaphragm portion 44 is constituted by a slender shape in correspondence with the groove-like recess portion 33 and is formed for each of the groove-like recess portions 33 . . . with regard to a sealing region for sealing the groove-like recess portion 33. Specifically, a width of the diaphragm portion 44 is set to be substantially equal to a groove width of the groove-like recess portion 33 and a length of the diaphragm portion 44 is set to be more or less shorter than the length of the groove-like recess portion 33. With regard to the length, according to the embodiment, the length is set to about ⅔ of the length of the groove-like recess portion 33. Further, with regard to a forming position, as shown by FIG. 2, one end of the diaphragm portion 44 is aligned with one end (end portion on a side of the communication port 34) of the groove-like recess portion 33.

As shown by FIG. 7(*b*), the diaphragm portion 44 is fabricated by removing a portion of the support plate 42 in correspondence with the groove-like recess portion 33 in a ring-like shape by etching or the like to leave only the elastic film 43 and an island portion 47 is formed in the ring. The island portion 47 is a portion bonded with a front end face of the piezoelectric oscillator 10.

An ink supply port 45 is a hole for communicating the pressure generating chamber 29 and a common ink chamber 14 and is penetrated in a plate thickness direction of the elastic plate 32. Also the ink supply ports 45 are formed at the respective groove-like recess portions 33 . . . at positions in correspondence with the groove-like recess portions 33 similar to the diaphragm portion 44. As shown by FIG. 2, the ink supply port 45 is bored at a position in correspondence with other end of the groove-like recess portion 33 on a side opposed to the communication port 34. Further, a diameter of the ink supply port 45 is set to be sufficiently smaller than the groove width of the groove-like recess portion 33. According to the embodiment, the ink supply port 45 is constituted by a small through hole of 23 micrometers.

The reason of constituting the ink supply port 45 by the small through hole is for providing a flow path resistance in the pressure generating chamber 29 and the common ink chamber 14. That is, according to the recording head 1, ink drops are ejected by utilizing a variation in a pressure applied to ink at insides of the pressure generating chamber 29. Therefore, in order to efficiently eject ink drops, it is important to prevent the ink pressure in the pressure generating chamber 29 from being escaped to the side of the common ink chamber 14 as less as possible. From the view point, according to the embodiment, the ink supply port 45 is constituted by the small through hole.

Further, when the ink supply port 45 is constituted by the through hole as in the embodiment, there is an advantage that working is facilitated and the high dimensional accuracy is achieved. That is, since the ink supply port 45 is the through hole, the ink supply port 45 can be fabricated by laser machining. Therefore, even the small diameter can be fabricated with high dimensional accuracy and also the operation is facilitated.

The compliance portion 46 is a portion for partitioning a portion of the common ink chamber 14. That is, the common ink chamber 14 is partitioned to form by the compliance portion 46 and the front end recess portion 15. The compliance portion 46 is constituted by a trapezoidal shape substantially the same as a shape of the opening of the front end recess portion 15 and fabricated by removing a portion of the support plate 42 by etching or the like to be constituted only by an elastic film 43.

Further, the support plate 42 and the elastic film 43 constituting the elastic plate 32 are not limited to those in the example. For example, polyimide may be used as the elastic film 43. Further, the elastic plate 32 may be constituted by a metal plate provided with a thick-walled portion constituting a diaphragm portion 44 and a thin walled portion at a periphery of the thick-walled portion and a thin walled portion constituting the compliance portion 46.

Next, the nozzle plate 31 will be explained. The nozzle plate 31 is a plate-like member made of a metal aligned with nozzle openings 48. According to the embodiment, a stainless steel plate is used therefor and a plurality of the nozzle openings 48 . . . are opened by a pitch in correspondence with a dot forming density. According to the embodiment, the nozzle row is constituted by aligning a total of 180 pieces of the nozzle openings 48 . . . and two rows of the nozzle rows are formed to align transversely. Further, when the nozzle plate 31 is bonded to other surface of the pressure generating chamber forming plate 30, that is, the surface on the side opposed to the elastic plate 32, the respective nozzle openings 48 . . . face the corresponding communication ports 34.

Further, when the elastic plate 32 is bonded to one surface of the pressure generating chamber forming plate 30, that is, a face thereof for forming the groove-like recess portion 33, the pressure generating chamber 29 is partitioned to form by sealing the opening face of the groove-like recess portion 33 by the diaphragm portion 44. Similarly, also the opening face of the dummy recess portion 36 is sealed to partition to form the dummy pressure generating chamber. Further, when the nozzle plate 31 is bonded to other surface of the pressure generating chamber forming plate 30, the nozzle opening 48 faces the corresponding communication port 34. When the piezoelectric oscillator 10 bonded to the island 47 is elongated and contracted under the state, the elastic film 43 at a periphery of the island portion 47 is deformed, the island portion 47 is pushed to the side of the groove-like recess portion 33 or pulled in a direction of being remote from the side of the groove-like recess portion 33. By deforming the elastic film 43, the pressure generating chamber 29 is expanded or contracted to provide a variation in the pressure to ink at inside of the pressure generating chamber 29.

Further, when the elastic plate 32 (that is, the flow path unit 4) is bonded to the case 2, the compliance portion 46 seals the front end recess portion 15. The compliance portion 46 absorbs a pressure variation of ink stored in the common ink chamber 14. That is, the elastic film 43 is expanded or contracted to deform in accordance with the pressure of stored ink. Further, the escaping recess portion 35 forms a space for expanding the elastic film 43 in expanding the elastic film 43. Further, the escaping recess portion 35 can also achieves a reservoir function of ink by removing the compliance portion 46 and contracting a volume of the common ink chamber 14. Further, by constituting a region of the escaping recess portion 35 not by a recess portion but by a penetrated portion, the space can be made to constitute a reservoir.

The recording head 1 having the above-described constitution includes a common ink flow path from the ink supply needle 19 to the common ink chamber 14 and an individual ink flow path reaching each of the nozzle openings 48 . . . by passing the pressure generating chamber 29 from the common ink chamber 14. Further, ink stored in the ink cartridge is introduced from the ink supply needle 19 and is stored to the ink storing chamber 14 by passing the common ink flow path. Ink stored in the common ink chamber 14 is ejected from the nozzle opening 48 by passing the individual ink flow path.

For example, when the piezoelectric oscillator 10 is contracted, the diaphragm portion 44 is pulled to the side of the oscillator unit 3 to expand the pressure generating chamber 29. Inside of the pressure generating chamber 29 is brought under a negative pressure by the expansion and therefore, ink in the common ink chamber 14 is made to flow into each pressure generating chamber 29 by passing the ink supply port 45. Thereafter, when the piezoelectric oscillator 10 is expanded, the diaphragm portion 44 is pushed to the side of pressure generating chamber forming plate 30 to contract the pressure generating chamber 29. By the contraction, the ink pressure in the pressure generating chamber 29 rises and ink drops are ejected from the corresponding nozzle opening 48.

Further, according to the recording head, the bottom face of the pressure generating chamber 29 (groove-like recess portion 33) is recessed in the V-like shape. Further, according to the partition wall portion 28 for partitioning the contiguous pressure generating chambers 29, 29, the wall thickness of the root portion is formed to be thicker than the wall thickness of the front end portion. Thereby, the rigidity of partition wall portion 28 can be increased more than that in the background art. Therefore, even when a variation is produced in the ink pressure at inside of the pressure generating chamber 29 in ejecting ink drops, the pressure variation can be made to be difficult to be transmitted to the contiguous pressure generating chamber 29. As a result, so-to-speak contiguous cross talk can be prevented and ejection of ink drops can be stabilized.

Further, according to the embodiment, the ink supply port 45 for communicating the common ink chamber 14 and the pressure generating chamber 29 is constituted by a small hole penetrated in a plate thickness direction of the elastic plate 32 and therefore, a high dimensional accuracy is easily achieved by laser working or the like. Thereby, characteristics of flowing of ink to the respective pressure generating chambers 29 . . . (flowing speeds, flowing amounts or the like) can be made to be equal at a high level. Further, when the small hole is worked by laser ray, the fabrication is also facilitated.

Further, according to the embodiment, the dummy pressure generating chambers (that is, hollow portion partitioned by the dummy recess portion 36 and the elastic plate 32) which is not related to ejection of ink drops are provided contiguously to the pressure generating chambers 29, 29 at the end portions of the row and therefore, with regard to the pressure generating chambers 29, 29 at the both ends, one side thereof is formed with the contiguous pressure generating chamber 29 and opposed side thereof is formed with the dummy pressure generating chamber. Thereby, with regard to the pressure generating chambers 29, 29 at the end portions of the row, the rigidity of the partition wall partitioning the pressure generating chamber 29 can be made to equal to the rigidity of the partition wall in other of the pressure generating chambers 29 . . . at a middle of the row. As a result, ink drop ejecting characteristics of all of the pressure generating chambers 29 of one row can be made to be equal.

Further, with regard to the dummy pressure generating chamber, the width of the side of the aligning direction is made to be wider than the width of each of the pressure generating chambers 29 . . . . In other words, the width of the dummy recess portion 36 is made to be wider than the width of the groove-like recess portion 33. Thereby, ejecting characteristics of the pressure generating chamber 29 at the end portion of the row and the pressure generating chamber 29 at the middle of the row can be made to be equal with a higher accuracy.

Further, according to the embodiment, the front end recess portion 15 is formed by partially recessing a front end face of the case 2, the common ink chamber 14 is partitioned to form by the front end recess portion 15 and the elastic plate 32 and therefore, an exclusive member for forming the common ink chamber 14 is not needed and simplification of the constitution is achieved. Further, the case 2 is fabricated by molding a resin and therefore, also fabrication of the front end recess portion 15 is comparatively easy.

Next, a method of fabricating the recording head 1 will be explained. Further, the fabricating method is characterized in a step of fabricating the pressure generating chamber forming plate 30 and therefore, an explanation will be given centering on the step of fabricating the pressure generating chamber forming plate 30. Further, the pressure generating chamber forming plate 30 is fabricated by forging by successively feeding dies. Further, a strip used as a material of the pressure generating chamber forming plate 30 is made of nickel as described above.

The step of fabricating the pressure generating chamber forming plate 30 is constituted by a groove-like recess portion forming step of forming the groove-like recess portion 33 and a communication port forming step of forming the communication port 33 and is carried out by successively feeding dies.

Figure 8:
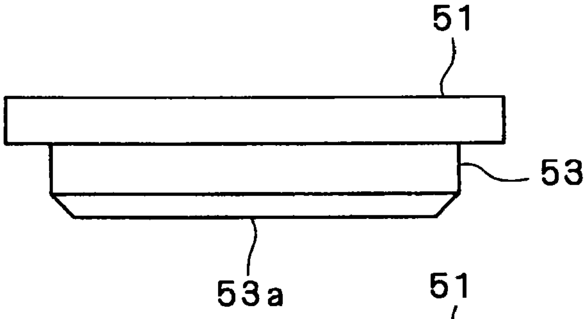
FIGS. 8(*a*) and 8(*b*) are views for explaining a male die used for forming a groove-like recess portion.
Figure 8:
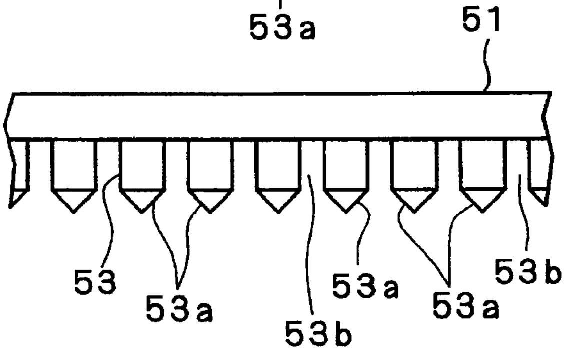
Figure 9:
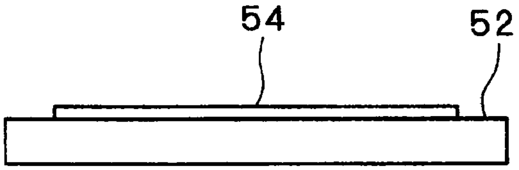
FIGS. 9(*a*) and 9(*b*) are views for explaining a female die used for forming the groove-like recess portion.
Figure 9:
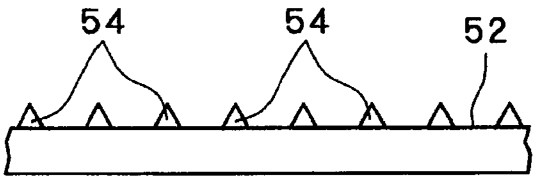

In the groove-like recess portion forming step, a male die 51 shown in FIG. 8 and a female die 52 shown in FIG. 9 are used. The male die 51 is a die for forming the groove-like recess portion 33. The male die 51 is aligned with projected streak portions 53 for forming the groove-like recess portions 33 by a number the same as that of the groove-like recess portions 33. Further, there are also provided dummy projected streak portions (not illustrated) for forming the dummy recess portion 36 contiguously to the projected streak portions 53 at both end portions in the aligning direction. A front end portion 53*a* of the projected streak portion 53 is constituted by a converging hat shape, and as shown by, for example, FIG. 8(*b*), faced by an angle of about 45 degrees from a center in a width direction. That is, the front end portion 53*a* in a wedge-like shape is formed by an inclined face of the hat shape formed at a front end of the projected streak portion 53. Thereby, the front end portion 53*a* is sharpened in a V-like shape by viewing from a longitudinal direction. Further, as shown by FIG. 8(*a*), both ends in the longitudinal direction of the front end portion 53*a* are faced by an angle of about 45 degrees. Therefore, the front end portion 53*a* of the projected streak portion 53 is constituted by a shape of facing both ends of a triangular prism.

Further, the female die 52 is formed with a plurality of the streak-like projections 54 at an upper face thereof.

The streak-like projection 54 is for assisting to form a partition wall for partitioning the contiguous pressure generating chambers 29, 29 and is disposed at a position opposed to the projected streak portion 53. The streak-like projection 54 is constituted by a wedge shape and a length thereof is set to be about the same as a length of the groove-like recess portion 33 (projected streak portion 53).

Figure 10:
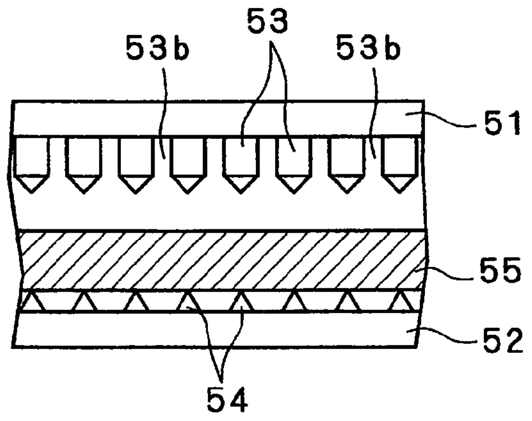
FIG. 10(*a*) through 10(*c*) are schematic views for explaining formation of the groove-like recess portion.
Figure 10:
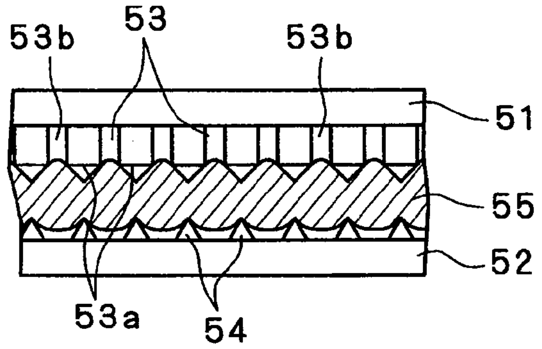
Figure 10:
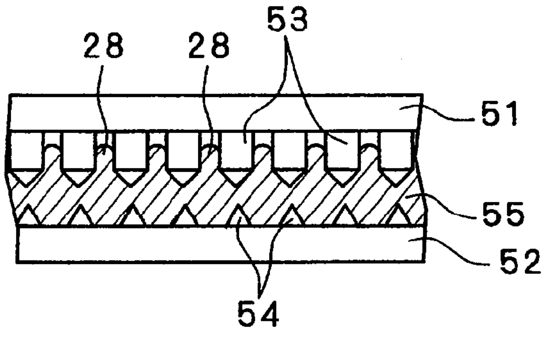
Figure 11:
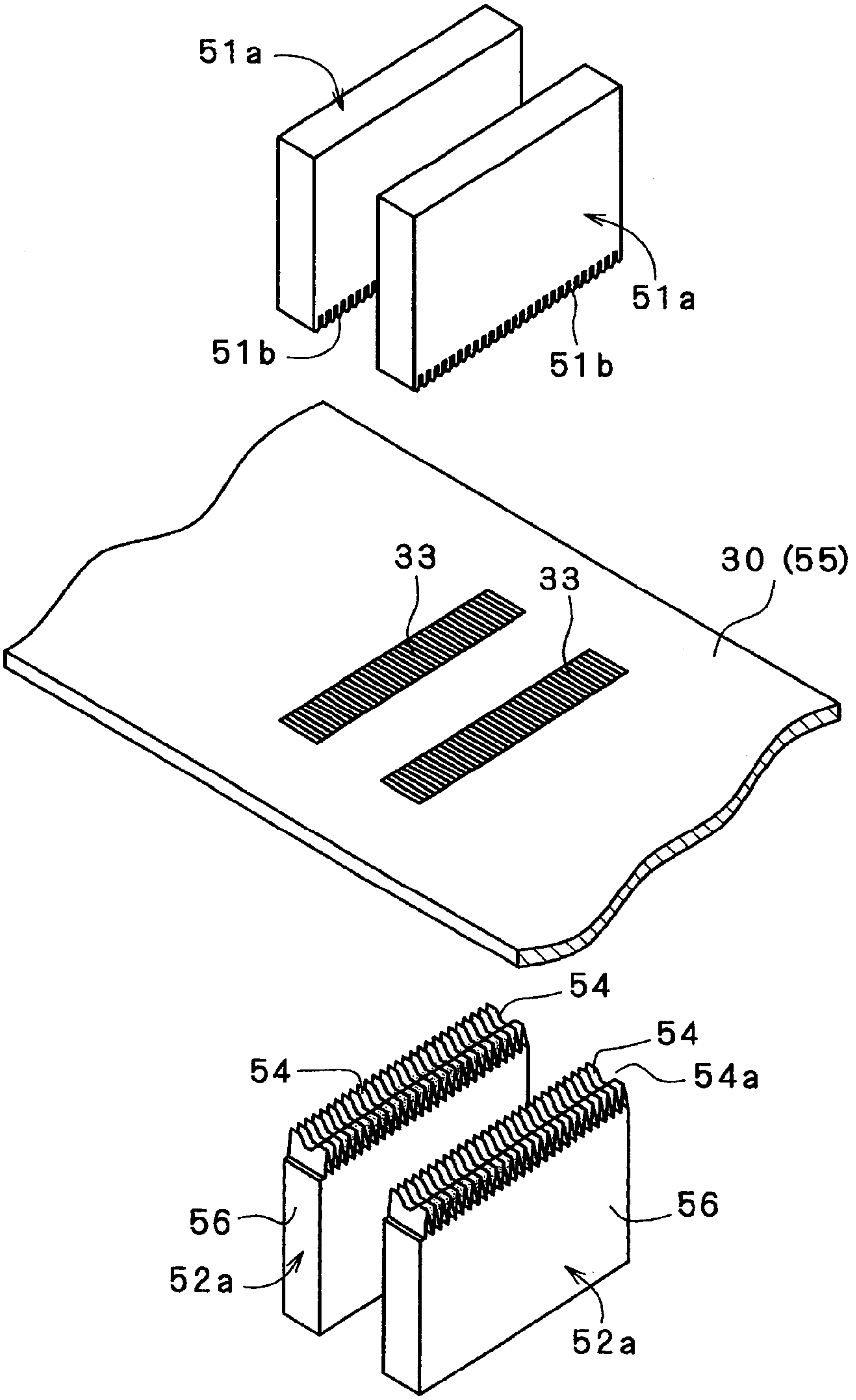
FIG. 11 is a perspective view showing a relationship of dies and a material.

Further, in the groove-like recess portion forming step, first, as shown by FIG. 10(*a*), the strip 55 constituting the material and the pressure generating chamber forming plate is mounted on an upper face of the female die 52, and the male die 51 is arranged above the strip 55. Next, as shown by FIG. 10(*b*), the front end portion of the projected streak portion 53 is pressed into the strip 55 by moving down the male die 51. At this occasion, since the front end portion 53*a* of the projected streak portion 53 is sharpened in the V-like shape, the front end portion 53*a* can firmly be pressed into the strip 55 without buckling the projected streak portion 53. As shown by FIG. 10(*c*), the projected streak portion 53 is pressed up to a middle in a plate thickness direction of the strip 55.

By pressing the projected streak portion 53, a portion of the strip 55 flows and the groove-like recess portion 33 is formed. Here, since the front end portion 53*a* of the projected streak portion 53 is sharpened in the V-like shape, even the groove-like recess portion 33 having a small shape can be formed with a high dimensional accuracy. That is, a portion pressed by the front end portion 53*a* smoothly flows and therefore, the formed groove-like recess portion 33 is formed by a shape following a shape of the projected streak portion 53. At this occasion, the material flowing to be pressed to divide by the front end portion 53*a* flows into a gap portion 53*b* provided between the projected streak portions 53 and the partition wall portion 28 is formed. Further, since also the both ends in the longitudinal direction of the front end portion 53*a* are faced, also the strip 55 pressed at the portion smoothly flows. Therefore, also the both end portions in the longitudinal direction of the groove-like recess portion 33 can be fabricated with a high dimensional accuracy.

Further, since pressing of the projected streak portion 53 is stopped at the middle in the plate thickness direction, the strip 55 thicker than that in the case of forming a through hole can be used. Thereby, the rigidity of the pressure generating chamber forming plate 30 can be promoted, and a characteristic of ejecting ink drops can be promoted. Further, the pressure generating chamber forming plate 30 is facilitated to handle.

Further, a portion of the strip 55 is raised into a space between the contiguous projected streak portions 53, 53 by being pressed by the projected streak portion 53. Here, the streak-like projections 54 provided at the female die 52 are arranged at a position opposed to the projected streak portions 53, 53 and therefore, the streak-like projection 54 assists the strip 55 to flow into the space. Thereby, the strip 55 can be introduced efficiently into the space between the projected streak portions 53 and the raised portion can be formed to be high.

Formation of the groove-like recess portion 33 constituting the premise of the invention is basically as described above. Here, accuracy of forming the groove-like recess portion 33, above all, a processing of forming the partition wall portion 28 becomes important. In order to meet the request, according to the embodiment, the proper partition wall portion 28 is formed by providing a first die and a second die comprising a tentatively forming die and a finishing die to a forging punch and providing a special shape to the second die.

FIG. 11 through FIG. 14 show an embodiment of an apparatus of fabricating a recording head including the above-described dies and a method of fabricating a liquid ejection head. Further, portions achieving functions the same as those of portions which have already been explained are described with the same notations in the drawings.

Further, when the strip (material) 55 is plastically deformed by the male die 51 and the female die 52 under a normal temperature condition, further, also in plastic deformation explained below, similarly, plastic deformation is carried out under a normal temperature condition.

A male die 51*a*, that is, a first die is aligned with a number of forming punches 51*b*. In order to form the groove-like recess portion 33, the forming punch 51*b* is deformed slenderly to constitute a projected streak portion 53*c*. Further, the projected streak portions 53*c* are aligned in parallel by a predetermined pitch. Further, in order to form the partition wall portion 28, the gap portion 53*b* (refer to FIG. 8, FIG. 10) is provided between the forming punches 51*b*. FIG. 12(C) shows a state of pressing the first die 51*a* to the pressure generating chamber forming plate 30 (55) constituting the material.

On the other hand, the female die 52*a*, that is, a second die is provided with a recess portion 54*a* extended in the direction of aligning the projected streak portions 53*c* at portions thereof in correspondence with middle portions in the longitudinal direction of the projected streak portion 53*c*. Further, two kinds of dies of a tentatively forming die 56 and a finishing die 57 of the second die 52*a* are prepared.

The second die 52*a* is provided with the tentatively forming die 56 for tentatively forming and the finishing die 57 for finishing to work after tentative forming by the tentatively forming die 56 and therefore, the material 55 is made to flow into the gap portion 53*b* by the tentatively forming die 56, thereafter, a distribution of the material 55 in the gap portion 53*b* is made to be as proximate to the normal state as possible by the finishing die 57 and therefore, the amount of making the material flow into the gap portion 53*b* is brought into a state of being substantially straight in the length direction of the gap portion 53*b*, which is preferable when the portion is made to function as a member such as, for example, the partition wall portion 28 of the pressure generating chamber 29 of the liquid ejection head 1.

Constitution and operation of the second die 52*a* will be described in details as follows.

Figure 14:
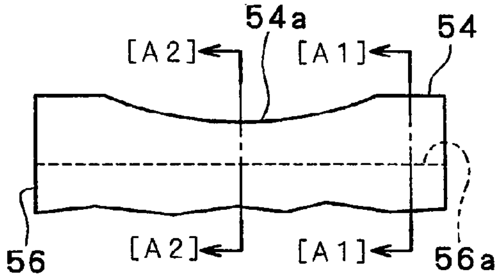
FIG. 14 illustrates a side views and sectional views showing a shape of a recess portion of a streak-like projection.
Figure 14:
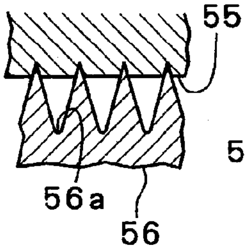
Figure 14:
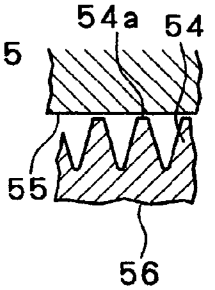

The tentatively forming die 56 is formed with a streak-like projection 54 opposed to the projected streak portion 53*c* and having a length substantially the same as that of the projected streak portion 53*c*. Further, the streak-like projection 54 is provided with a recess portion 54*a* a height of a middle portion in a length direction of which is set to be low. FIG. 14 illustrates a side view and sectional views showing to enlarge a portion of the streak-like projection 54 shown in FIG. 12. The recess portion 54*a* is formed substantially at a center portion in a length direction of the streak-like projection 54, a section of a portion other than the recess portion 54*a* is shown in (A1) and a section at a center portion of the recess portion 54*a* is shown in (A2).

Although the streak-like projection 54 shown in FIG. 9 and FIG. 10 is constituted by a member shape as in that of a projected streak having a low height, in order to form the recess portion 54*a*, a required height as shown by FIG. 12, FIG. 14 is needed for the streak-like projection 54. Therefore, as the streak-like projections 54 formed with the recess portions 54*a*, a number of "projected streaks" having a height are aligned in parallel and therefore, in FIG. 12, a sectional shape thereof is constituted by a shape of a wedge having a sharp front end. The wedge angle of the wedge shape portion is constituted by an acute angle equal to or smaller than 90 degrees. Further, valley portions 56*a* are formed by aligning the streak-like projections 54. Further, a raised portion 55*a* formed by a tentatively forming step, mentioned later, is illustrated at the rear face of the pressure generating chamber forming plate 55.

As shown by FIG. 10, FIGS. 12(B), (C) or the like, the streak-like projection 54 is arranged to be opposed to the projected streak portion 53*c*, and the material pressed by the streak-like projection 54 is made to flow plastically to the side of the gap portion 53*b*. As shown by FIG. 12, by arranging the streak-like projection 54 to be opposed to the projected streak portion 53*c*, an amount of deforming the material pressed between the streak-like projection 54 and the projected streak portion 53*c* is increased the most and therefore, a material at the portion is made to flow to a skewed upper side of each streak-like projection 54 to be pressed into the gap portion 53*b*. That is, a material is made to flow from both left and right sides to the single gap portion 53*b* to achieve a forming accuracy equivalent to those in FIG. 10 or the like.

A length of the recess portion 54*a* in the longitudinal direction of the streak-like projection 54 is set to be equal to or smaller than about ⅔ of the length of the streak-like projection 54 and is preferably equal to or smaller than ½. Further, the pitch of the streak-like projection 54 is 0.14 mm. With regard to the pitch of the streak-like projections 54, by making the pitch equal to or smaller than 0.3 mm, in working of a part of the liquid ejection head or the like, the part is preparatorily formed further preferably. The pitch is preferably equal to or smaller than 0.2 mm, further preferably equal to or smaller than 0.15 mm. Further, a surface of a portion of at least the recess portion 54*a* of the streak-like projection 54 is finished smoothly. Although as the finish, the mirror finish is preferable, otherwise, the surface may be subjected to chromium plating.

Figure 15:
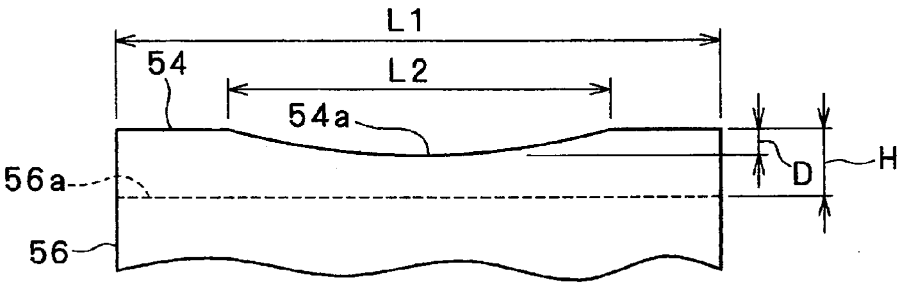
FIG. 15 is a side view showing dimensions of respective portions of the recess portion of the streak-like projection.

FIG. 15 is a side view showing dimensions of respective portions of the streak-like projection 54 or the like. A length L2 of the recess portion 54*a* as compared with a length L1 of the streak-like projection 54, that is, L2/L1 is equal to or smaller than ⅔, preferably equal to or smaller than ½ as described above. Further, notation H designates a length from the recess portion 54*a* to the streak-like projection 54, that is, a height of the streak-like projection 54, and notation D designates a depth of the recess portion 54*a*. As mentioned later, in order to achieve excellent plastic flow of the material at the gap portion 53*b*, predetermined dimensional ratios are set among the dimensions of the respective portions.

That is, a ratio of the depth D as compared with the length L2 of the recess portion 54*a* is about 0.05 through about 0.3. With regard to actual dimensions of L2, D, in this example, L2 is 0.5 mm through 1 mm, D is 0.05 mm through 0.15 mm. Further, a ratio of the depth D of the recess portion 54*a* as compared with the height H of the streak-like projection 54 is about 0.5 through about 1. An actual dimension of H in this example is 0.5 mm through 1.5 mm. Further, in this example, the length L1 of the streak-like projection 54 is 1.6 mm and L2/L1, mentioned above, is 0.31 through 0.62.

Figure 16:
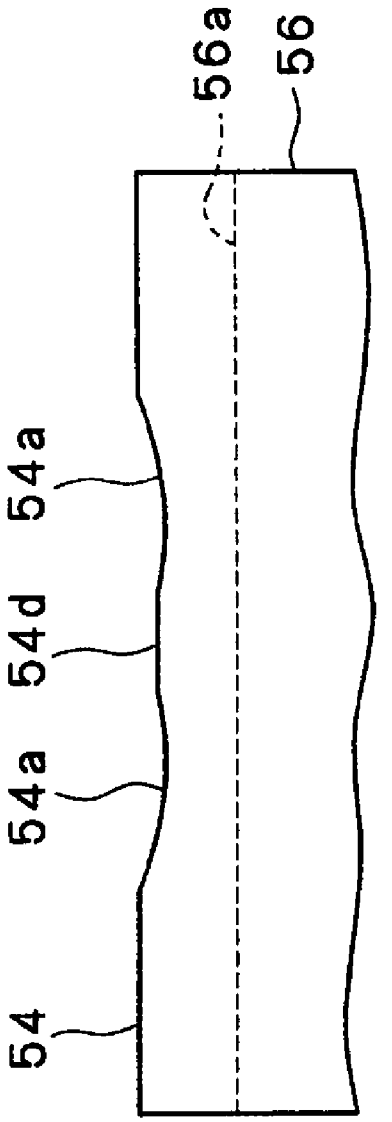
FIG. 16 is a side view showing a modified example of the recess portion of the streak-like projection.
Figure 16:
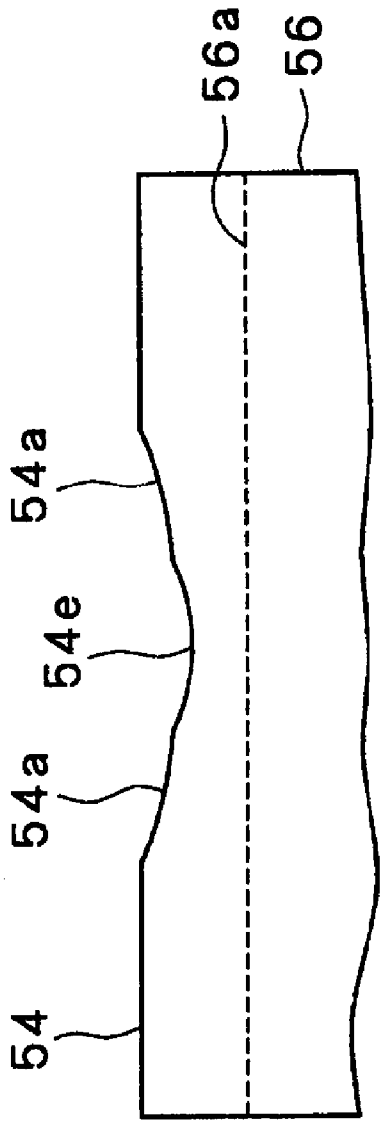

FIG. 16 shows a reinforcement measure provided to the streak-like projection 54 shown in FIG. 15, in FIG. 16(A), a reinforcement raised portion 54*d* is provided at a middle portion of the recess portion 54*a*, or in the illustrated example, a center portion of the streak-like projection 54. Thereby, in press forming, a force of expanding the recess portion 54*a* is operated to the tentatively forming die 56, thereby, stresses are concentrated on the deepest portion of the recess portion 54*a*, crack is liable to be brought about at the portion, however, by arranging the reinforcement raised portion 54*d*, the concentration of stresses is not brought about and also a concern of bringing about crack is resolved.

Further, in FIG. 16(B), an escaping recess portion 54*e* is provided at a middle portion of the recess portion 54*a*, or in the illustrated example, at a center portion of the streak-like projection 54. Thereby, although the material flowing in the recess portion 54*a* presses the deepest portion of the recess portion 54*a* and crack is liable to be brought about at the portion, by forming the escaping recess portion 54*e*, the deepest portion can be avoided from being pressed and also a concern of bringing about crack is resolved.

Figure 17:
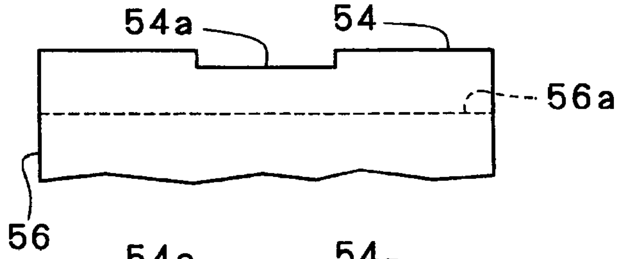
FIG. 17 illustrates side views showing other modified examples of the recess portion of the streak-like projection.
Figure 17:
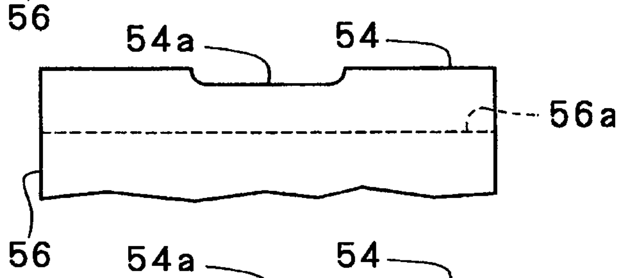
Figure 17:
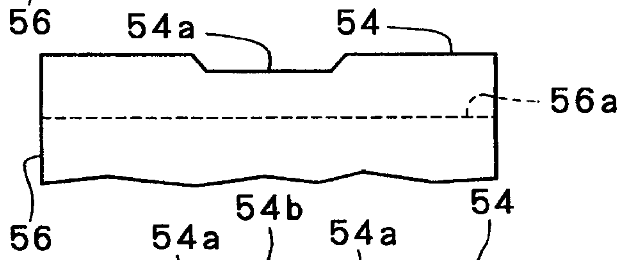
Figure 17:
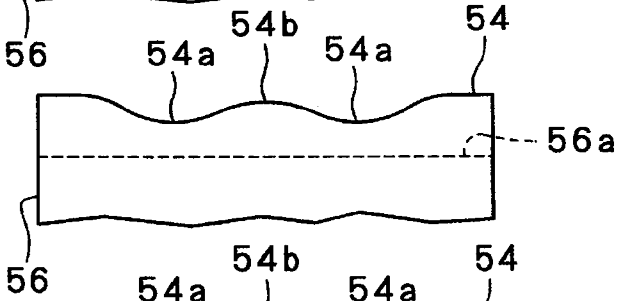
Figure 17:
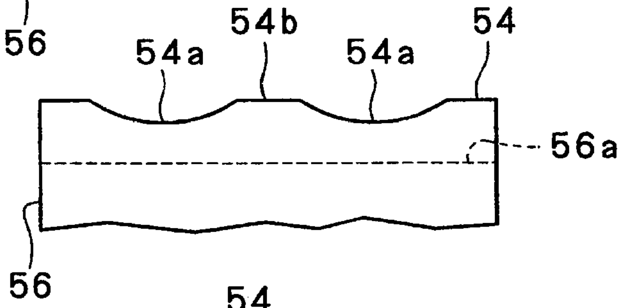
Figure 17:
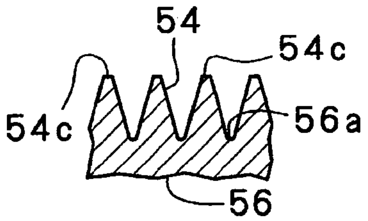

FIG. 17 shows a modified examples of the recess portion 54*a* of the streak-like projection 54. FIG. 17(A) shows a shape of a recess portion constituted by a plane, FIG. 17(B) shows a shape of a recess portion in which both end portions thereof are constituted by small curved faces and most of the recess portion is constituted by a plane, FIG. 15(C) shows a shape of recess portion in which both end portions are constituted by flat inclined faces and a center portion is constituted by a plane, FIGS. 17(D), (E) show shapes of recess portions in each of which a raised shape portion 54*b* is provided at a middle portion of the recess portion. The recess portion 54*a* is formed by cutting off a ridge line portion of the wedge shape portion as described above and therefore, a bottom face of the recess portion 54*a* becomes a plane when a section thereof is viewed as shown by FIG. 14(A2) and becomes a slender circular arc face at a total of the recess portion.

Although the streak-like projection 54 is constituted by the wedge shape and the front end portion is sharpened, as shown by FIG. 17(F), the streak-like projection 54 may be constituted by a flat top face 54*c* as shown by FIG. 17(F) or a shape of a rounded front end portion.

Figure 13:
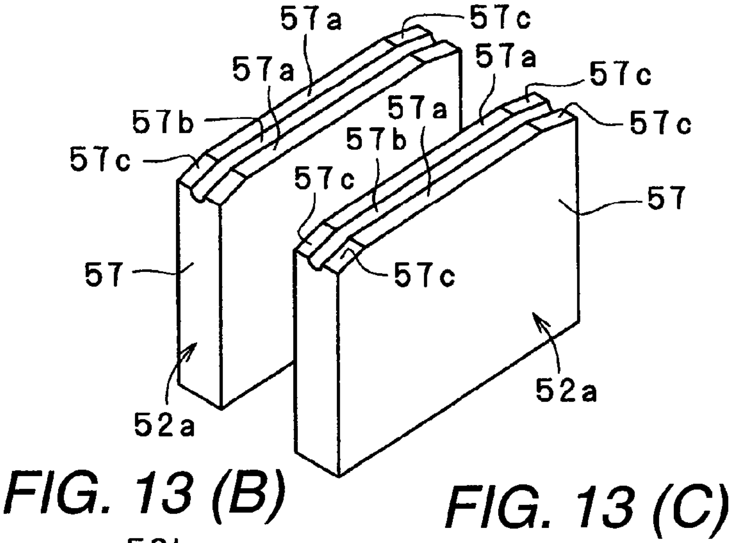
FIG. 13 illustrates a perspective view and sectional views showing a state of progressing finish forming.
Figure 13:
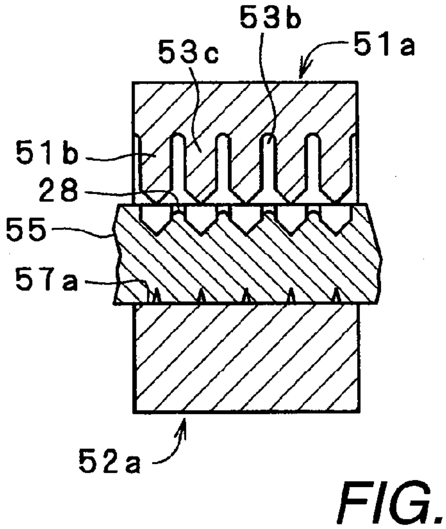
Figure 13:
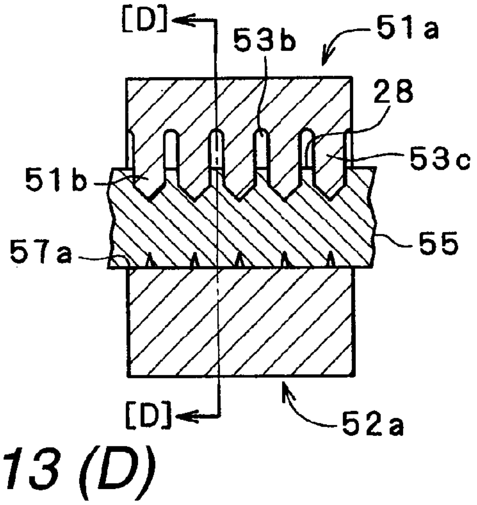
Figure 13:
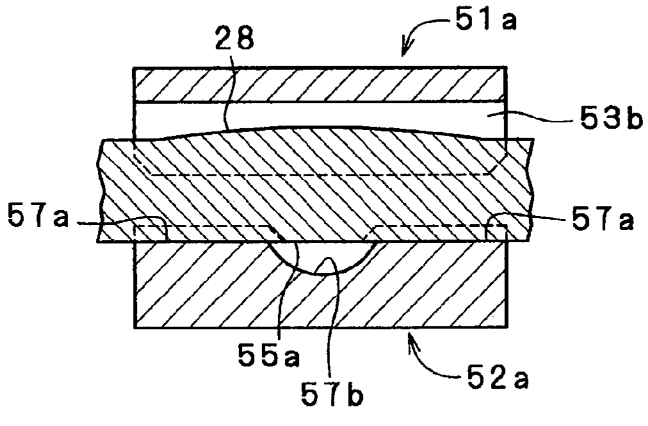

Next, as shown by FIG. 13, since the finishing die 57 of the second die 52*a* is used after tentative forming by the tentatively forming die 56, the finishing die 57 is formed with a flat face 57*a* removing the streak-like projection 54 of the tentatively forming die 56, further, a containing recess portion 57*b* is formed at a portion in correspondence with the recess portion 54*a* of the tentatively forming die 56. That is, in view from a width direction of a forming face of the finishing die 57, a center portion is formed with the containing recess portion 57*b* and the flat faces 57*a* are provided on both sides of the containing recess portion 57*b*.

The flat face 57*a* is constituted by a surface shape in which a portion thereof at a vicinity of an end portion in the direction of aligning the projected streak portions 53 becomes low to the end portion. The surface shape shown in FIG. 13(A) is constituted by an inclined face 57*c* continuous to the flat face 57*a*.

Figure 18:
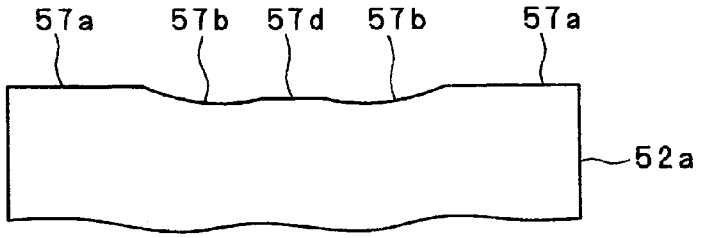
FIG. 18 illustrates side views showing modified examples of a recess portion of a finishing die.
Figure 18:
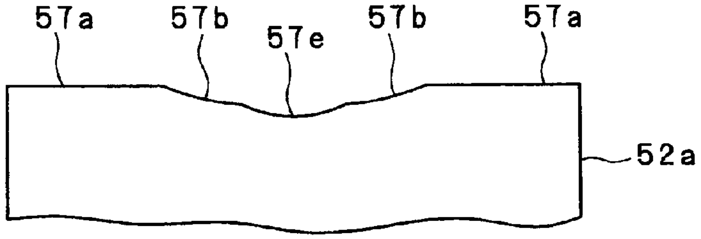

FIG. 18 shows a reinforcement measure provided to the containing recess portion 57*b* shown in FIG. 13(A), in FIG. 18(A), a reinforcement raised portion 57*d* is provided at a middle portion of the containing recess portion 57*b*, or in the illustrated example, a center portion in a width direction of the finishing die 57. Thereby, in press forming, a force of expanding the containing recess portion 57*b* is operated to the finishing die 57, thereby, stresses are concentrated on the deepest portion of the containing recess portion 57*b*, crack is liable to be brought about at the portion, however, by arranging the reinforcement raised portion 57*d*, the stresses are not concentrated thereon and also a concern of bringing about crack is resolved.

Further, FIG. 18(B) shows an escaping recess portion 57*e* at a middle portion of the containing recess portion 57*b*, or in the illustrated example, at a center portion in a width portion of the finishing die 57. Thereby, although the material flowing in the containing recess portion 57*b* presses the deepest portion of the containing recess portion 57*b* and crack is liable to be brought about at the portion, by arranging the escaping recess portion 57*e*, the deepest portion can be avoided from being pressed and also a concern of bringing about crack is resolved.

In the case in which a depth dimension and a length dimension of the containing recess portion 57*b* of the finishing die 57 are respectively 0.05 through 0.15 mm and 0.5 through 1 mm, in working to finish, a flow amount of the material in a direction substantially orthogonal to the pressing direction and a space of the recessed portion for receiving the amount can pertinently be balanced in view of a size, a pressing stroke and flow of the material in the gap portion 53*b* is optimized.

Figure 19:
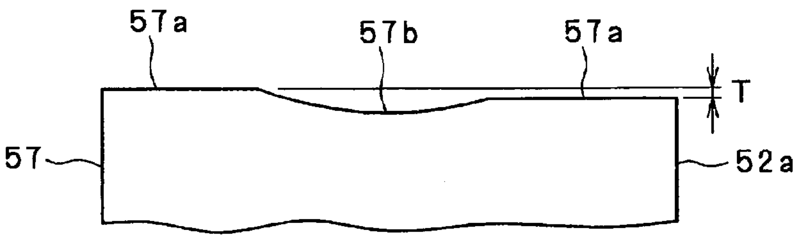
FIG. 19 is a side view showing a modified example of the recess portion of the finishing die.

According to a shape of the finishing die 57 shown in FIG. 19, with regard to the flat faces 57*a* arranged in parallel by interposing the containing recess portion 57*b*, the flat faces 57*a* on one side on a side of being proximate to the communication port 34 of the pressure generating chamber 29 is arranged at a position moved back from the flat face 57*a* on other side in a direction of being remote from the pressure generating chamber forming plate 30. That is, a stepped difference T is provided between the two flat faces 57*a*, 57*a*. Therefore, an amount of pressing the material pressed by the flat face 57*a* on one side on the side proximate to the communication port 34 becomes smaller than an amount of pressing the material pressed by the flat face 57*a* on other side. Therefore, a degree of plastic deformation is smaller on the side having a small pressing amount and therefore, in comparison with the side having the large pressing amount, an amount of spring back after having been pressed is shown to be large, and a depth of the groove-like recess portion 33 on the side of being proximate to the communication port becomes shallower than that on the side of being remote from the communication port. When the communication port 34 is opened on the shallow side of the groove-like recess portion 33 in this way while providing plastic deformation by the pressing force at the bottom portion of the groove-like recess portion 33 at a vicinity of the communication port 34, the depth of the groove-like recess portion 33 and the vicinity of the communication port 34 becomes deep and finally the depth of the groove-like recess portion 33 becomes substantially uniform over the total length. The depth of the pressure generating chamber 29 formed by the forming procedure becomes a uniform depth over the total length and therefore, amounts of ink in the respective pressure generating chambers 29 are made to be uniform, further, an abnormal flow path resistance is not operated to a flow of ink, and ejection of ink drops from the nozzle opening becomes normal. Further, a density and a degree of work hardening of the material on the side proximate to the communication port 34 become smaller than those on the other side. Therefore, a working resistance operated to a forming punch in forming the communication port 34 is reduced, durability of the forming punch is increased, further, the constitution is advantageous also for promoting working accuracy.

A width dimension in a longitudinal direction of the streak-like projection 54 of the tentatively forming die 56 and a width dimension in a direction orthogonal to the containing recess portion 57*b* of the finishing die 57 becomes substantially the same as the dimension in the length dimension of the pressure generating chamber 29. Therefore, since the two width dimensions of the tentatively forming die 56 and the finishing die 57 are constituted by a minimum dimension made to be substantially the same as the length dimension of the pressure generating chamber 29, dies suitable for working a small portion are provided by downsizing the tentatively forming die 56 and the finishing die 57.

Figure 20:
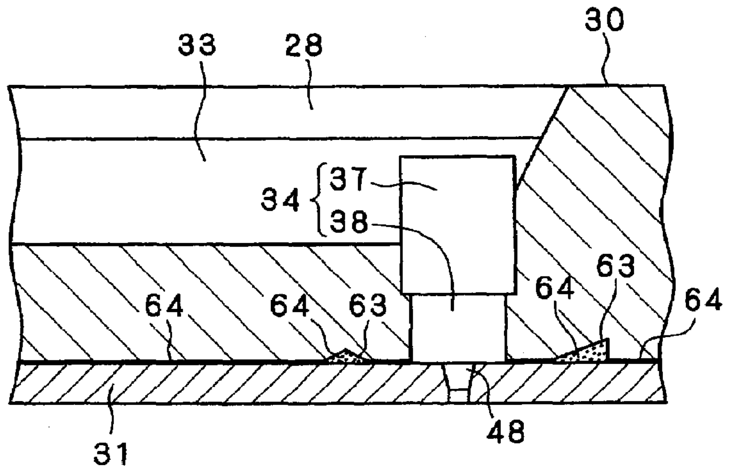
FIG. 20 illustrates a sectional view and partial plane views showing a portion of bonding the pressure generating chamber forming plate and a nozzle plate.
Figure 20:
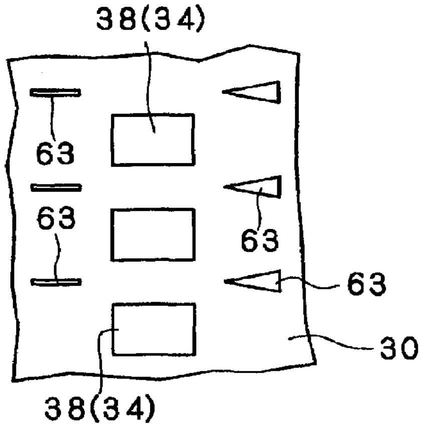
Figure 20:
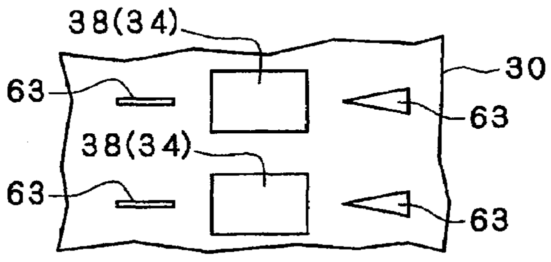

FIG. 20 illustrates a sectional view and plane views showing a partial structure of the recording head 1, showing an example in which the pressure generating chamber forming plate 30 and the nozzle plate 31 are bonded by an adhering agent 64 in a state in which a recess portion 63 is present at the pressure generating chamber forming plate 30 on a side of the nozzle plate 31. Although there are various methods as ways of arranging the recess portion 63, in this example, as shown by FIG. 12, in tentatively forming the groove-like recess portion 33, the projected streak portion 53*c* and the streak-like projection 54 are pressed into the pressure generating chamber forming plate 30, and the recess portion 63 is constituted by a press mark by pressing the streak-like projection

54. Although actually, the press mark of the streak-like projection 54 is constituted by a groove-like shape, the material at the portion of opening the communication port 34 is complicatedly changed in flowing and therefore, it seems that after polishing, the press mark remains at a vicinity of the communication port 34.

When the pressure generating chamber forming plate 30 and the nozzle plate 31 are bonded by the adhering agent 64, extra of the adhering agent 64 is contained in the recess portion 63 arranged as described above. Therefore, a film thickness of the adhering agent 64 becomes a thickness optimum for increasing an adhering strength, and a strength of bonding the pressure generating chamber forming plate 30 and the nozzle plate 31 can be strengthened.

FIG. 20(B) shows an arrangement of the recess portion 63 when the streak-like projection 54 is opposed to the gap portion 53*b* of the first die 51*a*, FIG. 20(C) shows an arrangement of the recess portion 63 when the streak-like projection 54 is opposed to the projected streak portion 53*c* of the first die 51*a*, in both cases, pitches of the recess portions 63 become a pitch substantially the same as that of the pressure generating chambers 29 (groove-like recess portion 33), further, the recess portion 63 is arranged at the vicinity of the opening portion of the communication port 34.

By constituting the pitch state, the recess portions 63 are distributed at constant intervals at the bonding face of the pressure generating chamber forming plate 30 on the side of the nozzle plate 31 and therefore, the film thickness of the adhering agent 64 is made to be proper over a wide range by uniformly containing the extra adhering agent 64 and the adhering strength is increased. Further, since the recess portion 63 is formed at the vicinity of the communication port 34 and therefore, the extra adhering agent 64 is contained in the recess portion 63 at the vicinity of the communication port 34 and is not extruded to a flow path space of the communication port 34. Therefore, air bubbles do not stay at the extruded portion and excellent flow of ink is ensured.

Next, an explanation will be given of working operation of a forging punch constituted by the first die 51*a*, the second die 52*a*.

According to the metal material plate 55 pressed between the two dies 51*a*, 52*a*, the material 55 is moved to flow to be pressed into the gap portion 53*b* of the first die 51*a*. At this occasion, the second die 52*a* is provided with the recess portion 54*a* the height of the middle portion of which is made to be low and therefore, the portions 56*b*, 56*b* (refer to FIG. 12(D)) proximate to the end portions of the second die 52*a* on the both sides of the recess portion 54*a*, an interval D1 between the two dies 51*a*, 52*a* is made to be narrower than an interval D2 of a middle portion (recess portion) thereof and an amount of pressing the material is increased at the narrow portion. The metal material plate 55 pressed in this way is made to flow to be extruded in a direction substantially orthogonal to the pressing direction, and more of the material is moved to a side of the recess portion 54*a* having the wider interval between the two dies 51*a*, 52*a* and having the small pressing amount. In other words, in flow of the material, the recess portion 54*a* achieves a function of providing a location of escaping the material 55. The material flows mainly along the longitudinal direction of the projected streak portion 53*c* or the gap portion 53*b*, further, a portion of the material 55 constitutes the raised portion 55*a* bulged to the side of the recess portion 55*a*.

Therefore, at the portion 56*b* having a large pressing amount, by strongly pressing the material, the material positively flows more to the recess portion 54*a* having a small pressing amount and therefore, much of the material flows to the gap portion 53*c* of a portion in correspondence with the recess portion 54*a*. In this way, the material is made to flow over an entire region of the gap portion while directing flow of the material to a side of the recess portion 54*a* at the both sides 56*b*, 56*b*. Further, since the projected streak portions 53*c* are aligned at the predetermined pitch, a phenomenon of making the material flow in the aligning direction (width direction of the projected streak portion) by pressing by the respective projected portions 53*c* is made to be uniform in both of the flowing direction and the flowing amount. The flow of the material 55 based on the predetermined pitch contributes to making the material flow uniformly to the respective gap portions 53*b* without disturbing the phenomenon of flowing in the longitudinal direction of the air gap portions 53*b*.

The material 55 flowing into the air gap portion 57*b* constitutes the partition wall portion 28 of the groove-like recess portion 33 and therefore, the shape of the space of the groove-like recess portion 33 can accurately be formed. Further, as forming to work the small structure, generally, a method of anisotropic etching is adopted, however, according to the method, a number of working steps is increased and therefore, the method is disadvantageous in view of fabrication cost. In contrast thereto, when the forging punch is used for the material made of a metal of nickel or the like, a number of working steps is considerably reduced, which is extremely advantageous in view of cost. Further, the volumes of the respective groove-like recess portions 33 can be worked uniformly and therefore, in forming the pressure generating chamber of the liquid ejection head, the method is very effective in view of stabilizing the ejection characteristic of the liquid ejection head.

Although the above-described working operation has been explained by emphasizing on an operational function of the recess portion 54*a* of the second die 52*a*, an operational function by the illustrated streak-like projection 54 and the recess portion 54*a* is as follows. FIG. 12(B) shows a state immediately before pressing the material 55 between the first die 51*a* and the second die 52*a*. When the material 55 is pressed between the two dies 51*a*, 52*a* as shown by FIGS. 12(C), (D) from the state, simultaneously with pressing the streak-like projection 54 to pierce into the material 55, the material is made to flow into the gap portion 53*b* and the partition wall portion 28 is tentatively formed.

In the stage of tentative forming, by the recess portion 54*a* of the streak-like projection 54, similar to the above-described case, much of the material 55 is made to flow to the side of the recess portion 54*a* at which a pressing amount is small and therefore, much of the material is made to flow also to the gap portion 53*b* at a portion in correspondence with the recess portion 54*a*. In this way, much of the material is made to flow over the entire region of the gap portion 53*b* while directing flow of the material to the side of the recess portion at both sides 56*b*, 56*b* of the recess portion 54*a*. Further, by synergetically operating a projection height of the streak-like recess projection 54 per se, more of the material 55 is positively pressed into the gap portion 53*b*. With regard to a height of the partition wall portion 28 in the tentatively formed state, as shown by FIG. 12(D), low portions 28*a*, 28*a* and a high portion 28*b* are formed. Such a difference in height is produced because the material 55 pressed at the portions 56*b*, 56*b* proximate to the end portions is made to flow more to a portion of the recess portion 54*a* and at that occasion, much of the material is made to flow into the gap portion 53*b*.

When tentative forming shown by FIGS. 12(C), (D) has been finished, as shown by FIG. 13(B), the material 55 in the tentatively formed state is transferred to between the first die 51*a* and the finishing die 57, where the material 55 is pressed by the two dies 51*a*, 52*a* as shown by FIG. 12(C). The finishing die 57 is formed with the flat faces 57*a* on both sides of the containing recess portion 57*b* and therefore, an amount of making the material 55 flow into the air gap portion 53*b* at the low portions 28*a*, 28*a* of the partition wall portion is increased and the height of the portions 28*a*, 28*a* is heightened. At this occasion, the raised portion 55*a* is contained in the containing recess portion 57*b* and is not exerted with a pressing force from the finishing die 57 and therefore, the height of the high portion 28*b* is hardly changed. Therefore, finally, as shown by FIG. 12(D), the height of the partition wall portion 28 becomes substantially a uniform height.

Further, at the stage of finish forming, since the inclined face 57*c* is formed, amounts of making the material 55 flow into the respective gap portions 53*b* are made to be as uniform as possible in all of the gap portions 53*b*. That is, the material 55 flowing in a direction of aligning the projected streak portions 53 flows little by little from a center portion of the alignment of the projected streak portions 53 to the sides of the end portions to bring about an integrally deviated state and vicinities of the end portions are brought into a so-to-speak large wall state. The material integrally deviated in this way is pressed by the lowered inclined face 57*c* and therefore, a material in the large wall state is prevented from excessively flowing into the gap portion 53*b*. Therefore, the amounts of making the material 55 flow into the respective gap portions 53*b* can be made as uniform as possible in all of the gap portions 53*b*.

The streak-like projection 54 is constituted by the wedge shape having the sharpened front end and therefore, the portion of the wedge shape firmly bites the material 55 and therefore, the material 55 at the portion opposed to the gap portion 53*b* can accurately be pressed and the material is firmly made to flow to the gap portion 53*b*. Further, by constituting the wedge angle by so-to-speak acute angle equal to or smaller than 90 degrees, biting of the wedge shape portion to the material 55 is further firmly be achieved. By making the pitch of the streak-like projection 54 equal to or smaller than 0.3 mm, the pressure generating chamber of the ink jet type recording head can be fabricated by extremely exquisite forging by the forging punch.

Further, the material is pressed between the projected streak portion 53*c* and the streak-like projection 54 by the largest amount and therefore, by synergetically functioning the projected height of the streak-like projection 54 per se opposed to the projected streak portion 53*c*, more of the material is positively pressed to the side of the gap portion 53*b*. That is, the material is pressed into the gap portion 53*b* by the streak-like projection 54 by a mode synergetic with a phenomenon of making the material flow from a portion having a large pressing amount to the side of the recess portion 54*a* having the small pressing amount similar to the above-described case and therefore, much of the material is made to flow also to the gap portion 53*b* at a portion in correspondence with the recess portion 54*a*. In this way, more of the material is made to flow over an entire region of the gap portion 53*b* by directing flow of the material to the side of the recess portion 54*a* on both sides of the recess portion 54*a*.

By constituting the recess portion 54*a* by a shape of a recess portion in a circular arc shape, a height of a middle portion of the second die is gradually changed and therefore, the amount of the material 55 flowing into the gap portion 53*b* is made to be as uniform as possible in view from a length direction of the gap portion 53*b*. Further, by constituting the recess portion 54*a* by a shape of a recess portion constituted by a plurality of planes, by selecting angles of inclining the planes, the height of the middle portion of the second die can be made to change gradually and the amount of the material 55 flowing into the gap portion 53*b* can be made to be as uniform as possible in view from the length direction of the gap portion 53*b*.

When the raised shape portion 54*b* is provided at a middle portion of the recess portion 54*a*, at a portion proximate to the raised shape portion 54*b* and the end portion of the second die 52*a*, the interval between the two dies 51*a*, 52*a* (corresponding to the interval D1) is narrowed, the recess portion 54*a* is constituted by a plurality of portions and therefore, pluralities of portions having large pressing amounts and portions having small pressing amounts are alternately arranged. Therefore, the portions having large pressing amounts (corresponding to the side 56*b*) and the recess portions 54*a* constituting destinations of flow of the material 55 are alternately arranged bit by bit and therefore, the amounts of the material 55 flowing to the gap portions 53*b* is made to be substantially uniform in view from the length direction of the air gap portions 53*b*.

The respective middle portions are disposed substantially at center portions in the length direction of the projected streak portion 53*c* and the streak-like projection 54 and therefore, the material is made to flow substantially uniformly on the both sides of the center portions and therefore, the material is made to flow substantially uniformly to the recess portion 54*a* having the small pressing amount from the both sides. Therefore, the amount of flow of the material at the recess portion 54*a* is made to be uniform over a total of the length of the recess portion 54*a*, for example, in a case of forming the partition wall portion 28 of the pressure generating chamber 29, the shape of the partition wall portion 28 can be provided with high accuracy.

By setting the length of the recess portion 54*a* in the longitudinal direction of the streak-like projection 54 to be equal to or smaller than about ⅔ of the length of the streak-like projection 54, an amount of flow of the material in the direction substantially orthogonal to the pressing direction and the space of the recess portion 54*a* receiving the amount can be pertinently balanced in view of the size of the pressing stroke, and flow of the material into the gap portion 53*b* is optimized. When the ratio of the depth dimension of the streak-like projection 54 as compared with the length direction of the recess portion 54*a* is about 0.05 through about 0.3, or when the ratio of the depth dimension of the recess portion 54*a* of the streak-like projection 54 as compared with the height dimension of the streak-like projection 54 is about 0.03 through about 0.3, the amount of flow of the material in the direction substantially orthogonal to the pressing direction and the space of the recess portion for receiving the amount can pertinently be balanced in view of the size of the pressing stroke and flow of the material into the gap portion 53*b* is optimized.

The surface of the portion of at least the recess portion 54*a* of the streak-like projection 54 is smoothly finished by mirror finish or chromium plating or the like and therefore, the material 55 flowing in the direction substantially orthogonal to the pressing direction is positively diverted in the recess portion 54*a* by the smooth surface state, and the material is made to be further positively flowed into the gap portion 53*b*.

The first die 51*a* and the second die 52*a* are fixed to a normal forging apparatus (not illustrated) for operating to move forward/rearward the dies, and the pressure generating chamber forming plate 30 (55) is arranged between the two dies 51*a* and 52*a* to work successively. Further, the second die 52*a* is constituted by constituting a set by the tentatively forming die 56 and the finishing die 57 and therefore, it is pertinent to align the tentatively forming die 56 and the finishing die 57 contiguous to each other and successively shifting the pressure generating chamber forming plate 30 (55).

The apparatus of forming the liquid ejection head is provided with at least the first die 51*a* provided with the projected streak portions aligned in parallel by the predetermined pitch and the gap portion 57*b* formed between the respective projected streak portions 53*c*, and the second die 52*a* for forging the metal material plate 55 from the both faces between the first die 51*a* and the second die 52*a*, and provided with the recess portion 54*a* extended in the direction of aligning the projected streak portions 53*c* at the portion in correspondence with the middle portion in the longitudinal direction of the projected streak portion 53*c* and therefore, the metal material plate 55 pressed between the two dies 51*a*, 52*a* is moved to flow to be pressed into the gap portion 53*b* of the first die 511*a*. At this occasion, since the second die 52*a* is provided with the recess portion 54*a* at the middle portion, at the portions on the both sides of the recess portion 54*a*, the interval between the two dies 51*a*, 52*a* becomes narrower than that at the middle portion (recess portion 54*a*) and at the narrow portion, the amount of pressing the material 55 is increased. The metal material plate 55 pressed in this way is made to flow to be extruded in the direction substantially orthogonal to the pressing direction, and more of the material is moved to the side of the recess portion 54*a* widening an interval between the two dies 51*a*, 52*a* and reducing the pressing amount. In other words, in flow of the material, the recess portion 54*a* achieves a function of providing a location of escaping the material 55. The material is moved mainly along the longitudinal direction of the projected streak portion 53*c* or the gap portion 53*b*, further, a portion of the material 55 constitutes a raised portion bulged to the side of the recess portion.

Therefore, at the portion having the large pressing amount, by strongly pressing the material, the material is positively made to flow to the gap portion 53*b*, further, more of the material 55 is made to flow to the side of the recess portion 54*a* having the small pressing amount and therefore, much of the material is made to flow to the gap portion 53*b* at the portion in correspondence with the recess portion 54*a*. In this way, much of the material is made to flow over an entire region of the gap portion 53*b* while directing the flow of the material 55 to a side of the recess portion 54*a* on the both sides of the recess portion 54*a*. Further, since the projected portions 53*c* are aligned by the predetermined pitch and therefore, a phenomenon of making the material flow in the aligning direction (width direction of the projected portion 53*c*) by pressing by the respective projected portions 53*c* is made to be uniform in either of the flowing direction of the flowing amount. The flow of the material 55 based on the predetermined pitch contributes to uniform flow of the material to the respective gap portions 53*b* without disturbing the phenomenon of making the material flow in the longitudinal direction of the gap portion 53*b*.

When the material 55 flowing to the gap portion 53*b* constitutes the partition wall portion 28 of the recess shape portion, a shape of the space of the recess can accurately be formed. Further, although as the method of forming to work a small structure, generally, the method of anisotropic etching is adopted, a number of working step is increased by the method and therefore, the method is disadvantageous in view of fabrication cost. In contrast thereto, when the forging punch is used for the material 55 made of a metal, a number of working steps is considerably reduced, which is extremely advantageous in view of cost. Further, volumes of the respective recess portions can uniformly be worked and therefore, for example, when the pressure generating chamber 29 of the recording head 1 or the like is formed, the forging punch is very effective in view of stabilizing the characteristic of ejecting ink drops of the recording head 1.

Further, since the second die 52*a* is constituted by the tentatively forming die 56 for tentatively forming the material to execute working operation precedingly and the finishing die 57 for finishing to work the material successive to tentative forming by the tentatively forming die 56. There is provided an apparatus of being operated efficiently capable of executing finish working in the state of successive feeding successive to tentative forming. Further, owing to the working operation having a continuity, positioning of an object to be worked in the respective steps can be set with high accuracy, which is effective for promoting a working accuracy.

A fine forging method can be carried out by using the above-described forging punch. According thereto, as a first step, the metal material plate 55 is preparatorily formed between the first die 51*a* and the tentatively forming die 56, and as a second step, the metal material plate 55 is worked to finish between the first die 51*a* and the finishing die 57. A state of progressing to work to deform the material 55 brought about in the first step and the second step are similar to that described in the forging punch.

Therefore, when the material 55 flowing into the gap portion 53*b* constitutes the partition wall portion 28 of the groove-like recess portion 33 of the recording head 1, a shape of the groove-like recess portion 33 can accurately be formed. Further, although for working to form such a fine structure, generally, a method of anisotropic etching is adopted, according to the method, a number of working steps is considerably increased and therefore, the method is disadvantageous in view of fabrication cost. In contrast thereto, according to the fine forging method constituting an object by the material made of a metal, a number of working steps is considerably reduced, which is extremely advantageous also in view of cost. Further, since volumes of the respective recess portions can uniformly be worked and therefore, for example, when the pressure generating chamber or the like of the liquid ejection head is finely formed, the method is very effective in view of stabilizing an ejection characteristic of the liquid ejection head.

Further, the method of fabricating a liquid ejection head of the embodiment constitutes an object of fabrication by a constitution including the pressure generating chamber forming plate 30 made of a metal aligned with the groove-like recess portion 33 for constituting the pressure generating chamber 29 and formed with the communication ports 34 penetrated in the plate thickness direction at one ends of the respective groove-like recess portions 33, the nozzle plate 31 made of a metal bored with the nozzle opening 48 at the position in correspondence with the communication port 34, and the sealing plate made of a metal for sealing the opening face of the groove-like recess portion 33 and bored with the ink supply port 45 at the position in correspondence with other end of the groove-like recess portion 33, in which the sealing plate (43) is bonded to the side of the groove-like recess portion 33 of the pressure generating chamber forming plate 30 and bonded with the nozzle plate on the opposed side, respectively.

As a specific method, the first die 51*a* is provided with the projected streak portions 53*c* aligned in parallel and the gap portions 53*b* formed between the projected streak portions 53*c*, as the second die 52*a*, there are prepared the tentatively forming die 56 provided with the streak-like projection 54 opposed to the projected streak portion 53*c* and having the length substantially the same as that of the projected streak portion 53*c*, the streak-like projection 54 being provided with the recess portion 54$a$ in which the height of the middle portion in the length direction is set to be low, and the finishing die 57 constituting the flat face 57$a$ by removing the streak-like projection 54 and provided with the containing recess portion 57$b$ at the portion in correspondence with the recess portion 54$a$, in the first step, the pressure generating chamber forming plate 30 is preparatorily formed between the first die 51$a$ and the tentatively forming die 56, and in the second step, the pressure generating chamber forming plate 30 is formed to finish between the first die 51$a$ and the finishing die 57 to thereby form the groove-like recess portion 33 at the pressure generating chamber forming plate 30.

Therefore, by an order of steps similar to that of the fine forging method, the groove-like recess portion 33 is worked at the pressure generating chamber forming plate 30. Summarizing the points, in the preparatory forming constituting the first step, more of the material is made to flow over an entire region of the gap portion 53$b$ while directing flow of the material of the pressure generating chamber forming plate 30 to the side of the recess portion 54$a$ on the both sides of the recess portion 54$a$. Successively, in the second step constituting the finish forming, by further pressing the pressure generating chamber forming plate 30 to the side of the gap portion by the flat face 57$a$, a height of flow of the material 55 into the gap portion 53$b$ is made to be as uniform as possible over the length direction of the gap portion 53$b$. At this occasion, since the raised portion 55$a$ is contained in the containing recess portion 57$b$, the material of an amount in correspondence with the raised portion 55$a$ is not moved into the gap portion 53$b$ and the uniform formation of the flow height is effectively functioned.

As described above, the groove-like recess portion 33 having the finely finished partition wall portion 28 is formed at the pressure generating chamber forming plate 30. According to the forming, a number of working steps is considerably reduced in comparison with that of the anisotropic etching method or the like, which is extremely advantageous in view of cost. Further, since volumes of the respective groove-like recess portions 33 can uniformly be worked, in finely forming the pressure generating chamber 29 or the like of the pressure ejection head 1, the method is an optimum fabrication method, and is effective for normally ensuring the liquid ejection characteristic.

In working to finish the groove-like recess portion 33 successive to tentative forming thereof, it is found that the following problem is posed.

Figure 21:
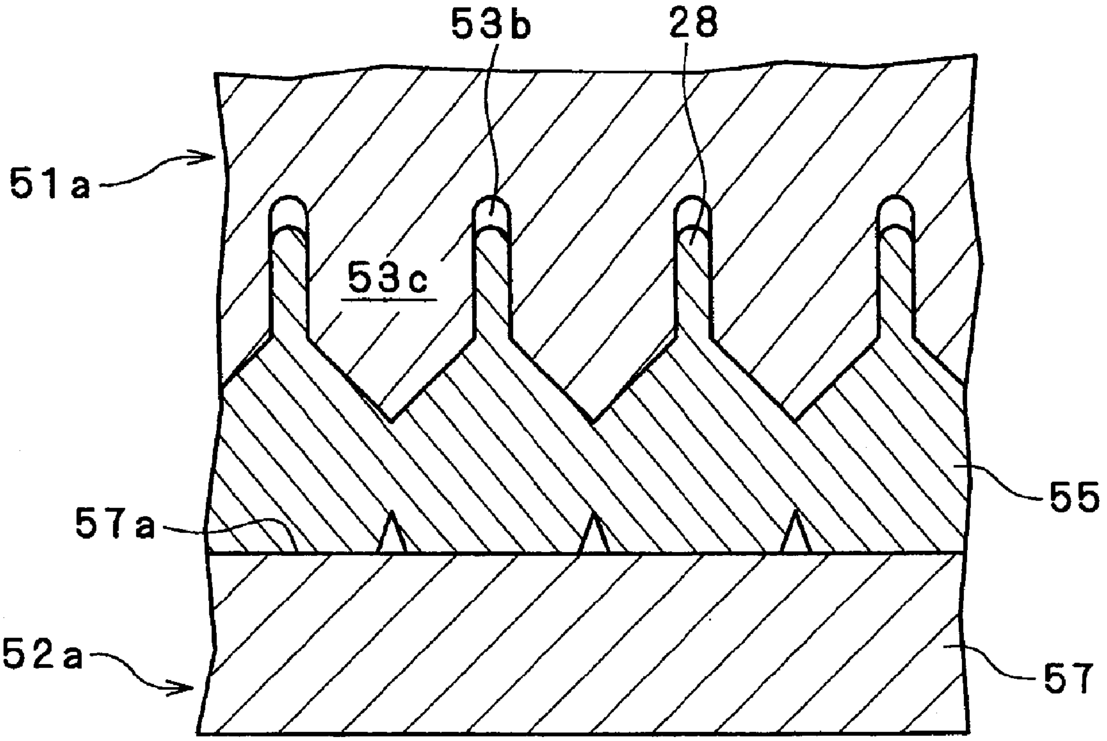
FIG. 21 is a sectional view showing a state of finishing to press in finish forming.
Figure 22:
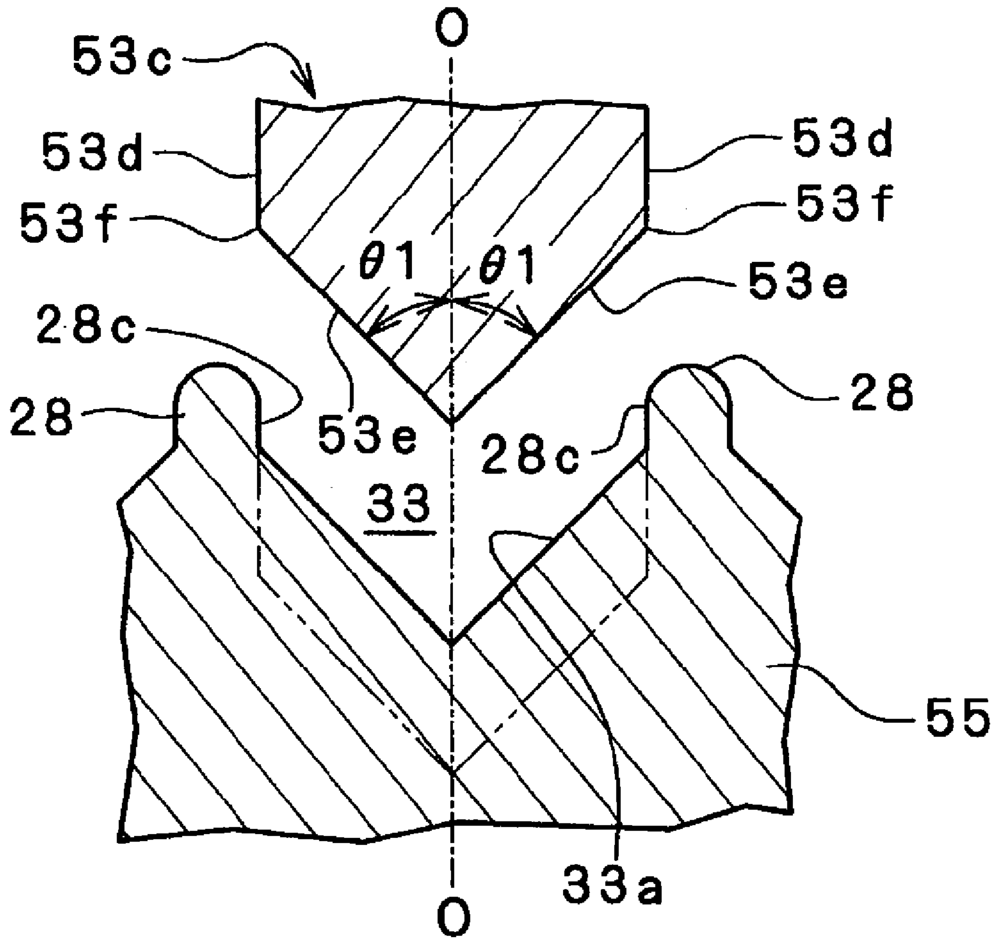
FIG. 22 is a sectional view showing a state immediately before the finish forming.

That is, FIG. 21 is a sectional view showing to enlarge a state in which the projected streak portion 53$c$ of the first die 51$a$ reaches a maximum pressing position for working to finish the groove-like recess portion 33 and FIG. 13(C) illustrates a similar state. In FIG. 21, notation 57 designates a finishing die, which is present as the second die 52$a$ for supporting the metal material plate 55 pressed with the first die 51$a$. Further, FIG. 22 is a sectional view showing a state immediately before working to finish the groove-like recess portion 33 by pressing the projected streak portion 53$c$ to the groove-like recess portion 33 which has been formed tentatively. Although at the tentative forming stage, as illustrated in the drawing by a bold line, a depth of the groove-like recess portion 33 is comparatively shallow, in working to finish the groove-like recess portion 33, the projected streak portion 53$c$ is pressed to a depth indicated by a two-dotted chain line.

As shown by FIG. 22, according to the groove-like recess portion 33, inner walls 28$c$, 28$c$ in the depth direction are opposed to each other in a parallel state, and a bottom portion 33$a$ in a shape of being recessed in a V-like shape is formed continuous to the two inner walls 28$c$, 28$c$. In order to form the groove-like recess portion 33 having such a shape, the projected streak portion 53$c$ is formed with inner wall forming portions 53$d$, 53$d$ for forming the inner walls 28$c$ in a state of being along a direction of pressing the projected streak portion 53$c$. Further, inclined face portions 53$e$, 53$e$ for forming the bottom portion 33$a$ is formed in a state of being continuous to the inner wall portion forming portions 53$d$, 53$d$. An inclined angle □1 of the inclined face portions 53$e$, 53$e$ is made to be 45 degrees relative to a line in a direction of pressing the projected streak portion 53$c$, that is, relative to an imaginary plane O-O illustrated in a longitudinal direction of the projected streak portion 53$c$ including a center line of the projected streak portion 53$c$. Further, the imaginary plane O-O is expressed as the direction of pressing the projected streak portion 53$c$ for convenience of explanation.

At a portion of intersecting the inner wall portion forming portion 53$d$ and the inclined face portion 53$e$, a corner portion 53$f$ is formed in a shape of a ridge line along the longitudinal direction of the projected streak portion 53$c$.

When the projected portion 53$c$ having the corner portion 53$f$ is pressed to the position indicated by the two-dotted chain line shown in FIG. 22 to work to finish the groove-like recess portion 33, there is brought about a phenomenon of cutting off an inner face of the groove-like recess portion 33 by the corner portion 53$f$ to form a shape of a face of small recesses and projections or a cut mark along the direction of pressing the projected streak portion 53$c$ from the inner wall 28$c$ over to the bottom portion 33$a$. Such an abnormal inner face is designated by notation 33$b$ in FIG. 23(A). Further, FIG. 23(B) is a sectional view showing a shape of a normal finish face formed by the projected streak portion 53$c$ by a fabricating apparatus according to the invention, mentioned later.

In order to resolve the above-described problem of the abnormal inner face 33$b$, a countermeasure described below is provided.

Figure 23:
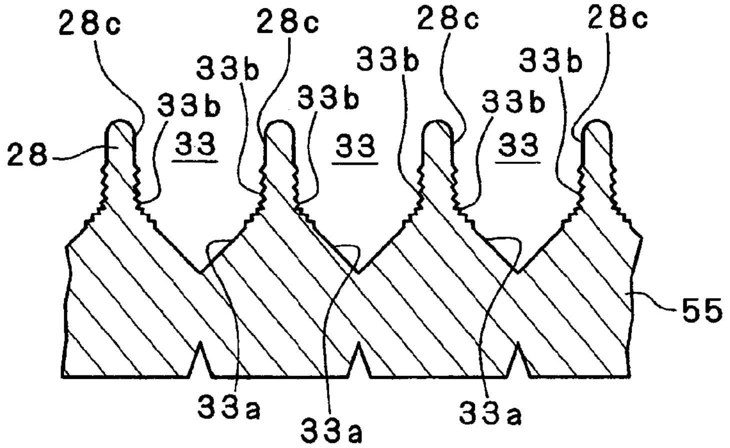
FIG. 23 illustrates sectional views showing an inner face of the groove-like recess portion after the finish forming.
Figure 23:
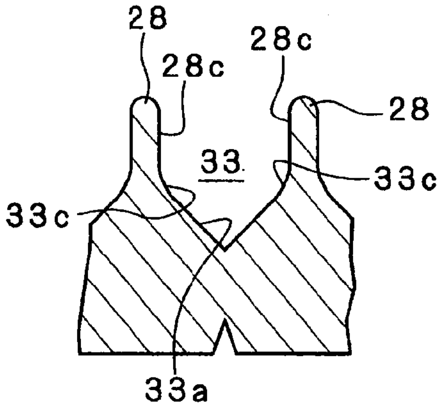
Figure 24:
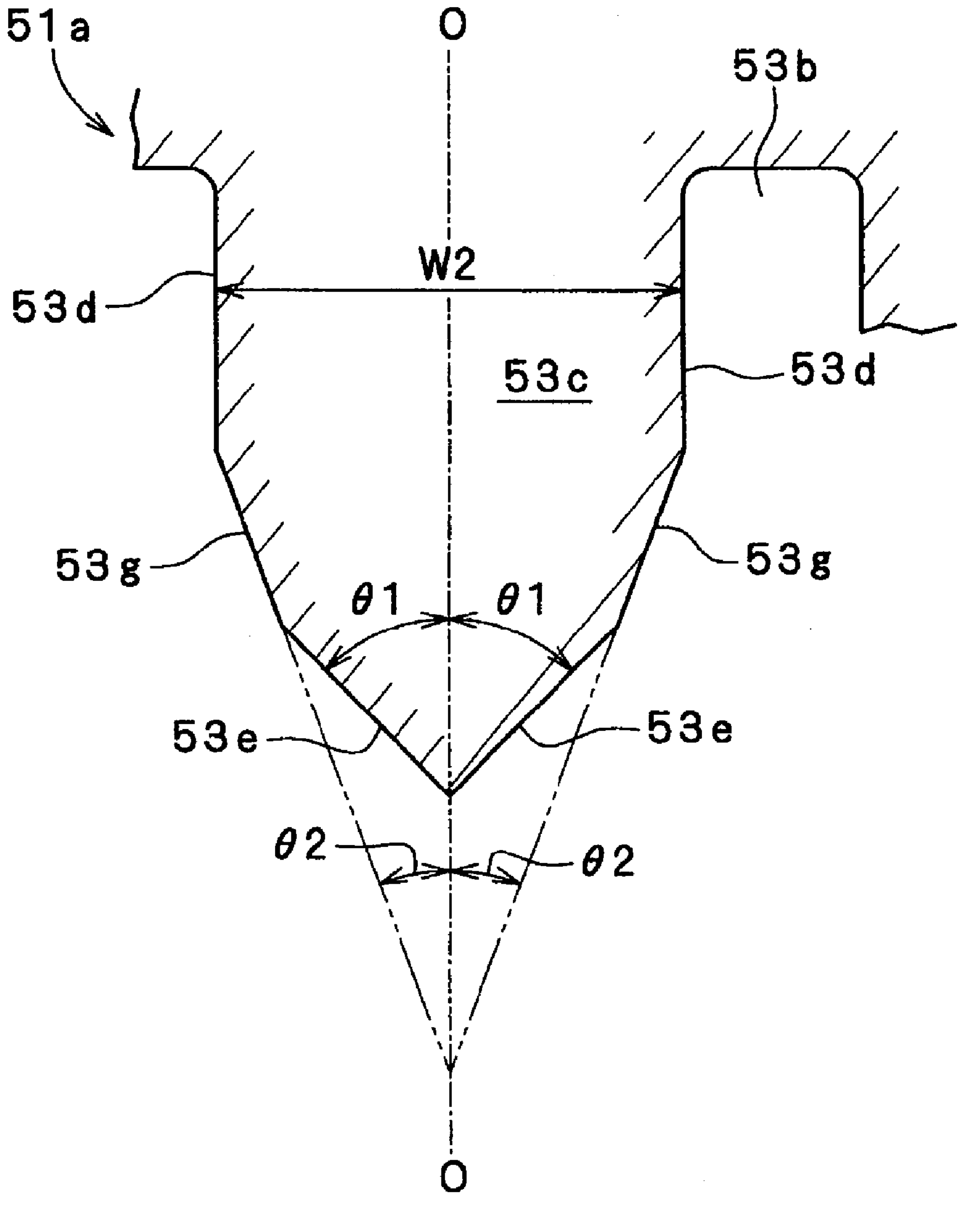
FIG. 24 is a sectional view enlarging to show a shape of a projected streak portion.
Figure 25:
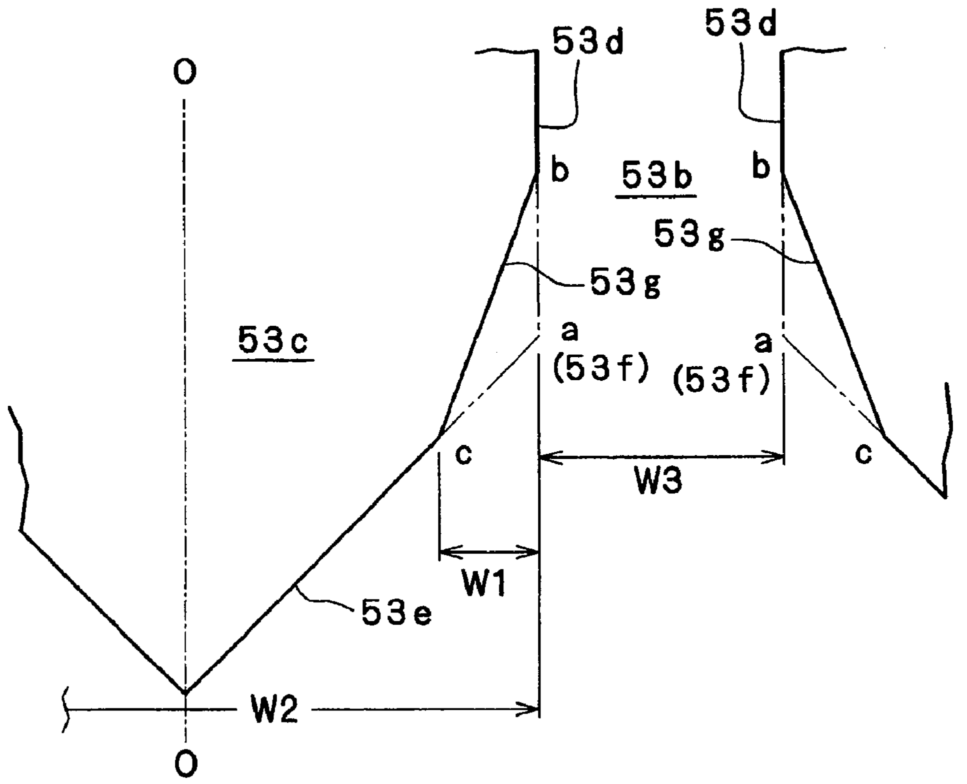
FIG. 25 is a sectional view further enlarging to show the shape of the projected streak portion.

A structure for the countermeasure is shown in FIG. 24 and FIG. 25, and the same notations are attached to portions achieving functions similar to those of FIG. 21 through FIG. 23. In order to prevent the abnormal inner face 33$b$ from being formed by the corner portion, a connecting face portion 53$g$ for connecting the inner wall forming portion 53$d$ and the inclined face portion 53$e$ is provided. According to the example, the connecting face portion 53$g$ is a plane. A triangle formed by an intersecting portion a at which an extended face of the inner wall forming portion 53$d$ and an extended face of the inclined face portion 53$e$ are intersected with each other, an inner wall forming portion side end portion b of the connecting face portion 53$g$, and an inclined face side end portion c of the connecting face portion 53$g$ is constituted by a shape of substantially an isosceles abc constituting a base by the connecting face portion 53$g$ on an imaginary section orthogonal to the longitudinal direction of the projected streak portion 53$c$.

It is preferable that an included angle made by the pressing direction O-O (the imaginary plane) of the projected streak portion 53$c$ and the inclined face portion 53$e$, that is, the inclined angle □1 is selected from a range of 40 through 50 degrees and it is optimum to set the angle to 45 degrees as described above. By constituting such an angular range, fluidity of the material of the metal material plate 55 is excellently achieved, and a shape of the bottom portion 33$a$ is accurately formed.

Further, an included angle θ2 made by the pressing direction O-O (the imaginary plane) of the projected streak portion 53$c$ and the connecting face portion 53$g$ is 8 through 40 degrees, preferably, 10 through 35 degrees, further preferably, 15 through 30 degrees and most preferably around 23 degrees. By setting such an angle, occurrence of the abnormal inner face 33*b* can firmly be prevented.

A dimension W1 in a width direction of the projected streak portion 53*c* between the inclined face portion side end portion c of the connecting face portion 53*g* and the inner wall forming portion 53*d* is constituted by a ratio of 0.05 through 0.15 relative to a width dimension W2 of the projected streak portion 53*c*, preferably, 0.06 through 0.13, and further preferably, 0.08 through 0.10. By setting such a ratio, occurrence of the abnormal inner face 33*b* can firmly be prevented.

The dimension W1 in the width direction of the projected streak portion 53*c* between the inclined face portion side end portion c of the connecting face portion 53*g* and the inner wall forming portion 53*d* is constituted by a ratio of 0.06 through 0.45 relative to a width dimension W3 of the gap portion 53*b*, preferably, 0.10 through 0.40, further preferably, 0.15 through 0.30. By constituting such a ratio, occurrence of the abnormal inner face 33*b* can firmly be prevented.

Figure 26:
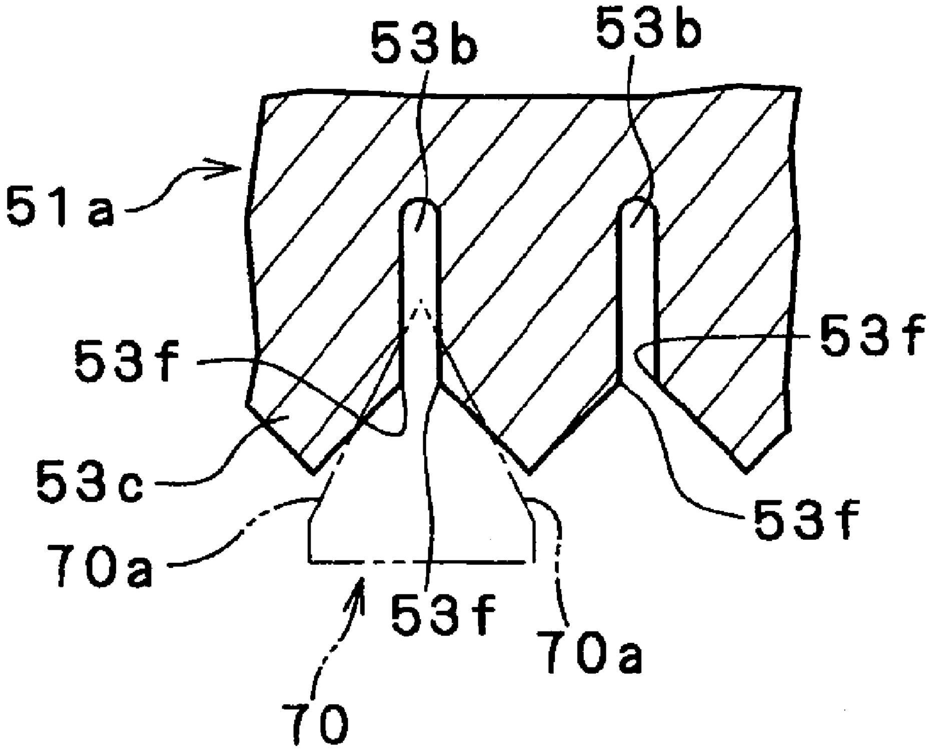
FIG. 26 is a sectional view showing a way of forming a connecting face portion.

As a method of providing the connecting face portion 53*g* at the projected streak portion 53*c*, various methods can be adopted. A method exemplified here is mainly by grinding. As a material, for example, a superhard alloy is used, first, the inclined face portion 53*e* is continuously formed by a profile grinder. Thereafter, as shown by FIG. 26, the connecting face portion 53*g* is formed by polishing the corner portion 53*f*. A sectional shape of a polishing tool 70 used for the polishing is illustrated by a two-dotted chain line, two of polishing faces 70*a*, 70*a* are arranged in a wedge-like shape and the two polishing faces 70*a*, 70*a* are intersected by an angle of about 50 degrees.

When the connecting face portion 53*g* has been formed by the polishing, next, in order to remove burrs or recesses and projections remaining at the worked portion, liquid lapping is carried out by a liquid dispersed with small abrasives. Further, finally, in order to constitute a surface by a predetermined hardness, DLC working (diamond-like coating) is carried out.

Figure 27:
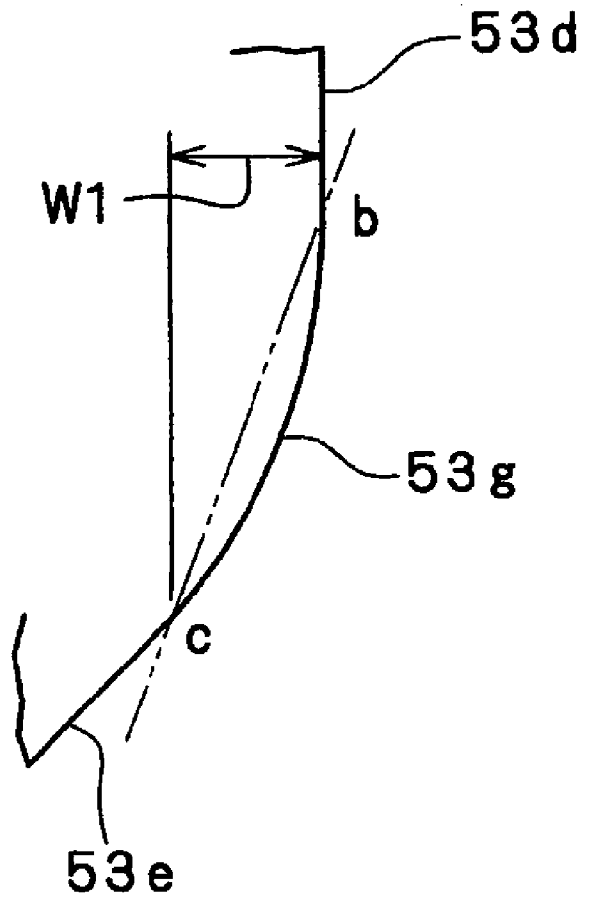
FIG. 27 is a partial sectional view when the connecting face portion is constituted by a curved face.

Although the above-described connecting face portion 53*g* is constituted by a plane, an example shown in FIG. 27 is a case of constituting the connecting face portion 53*g* by a curved face. Notations b, c in the drawing designate portions in correspondence with the end portions of the connecting face portion 53*g* shown in FIG. 25. Also in the case of FIG. 27, the dimension W1 similar to that of FIG. 25 can be set and ratios thereof as compared with W2 and W3 are the same as those in the case of FIG. 25.

FIG. 23(B) shows a state of finishing to work the groove-like recess portion 33 by using the projected streak portion 53*c* having the connecting face portion 53*g*. According to a normal inner face shape shown here, the inner wall 28*c* and the bottom portion 33*a* are connected by the smooth continuous face 33*c*, and a surface state such as abnormal recesses and projections or a scratch mark of the projected streak portion 53*c* (corner portion 53*f*) is not recognized at the inner face of the groove-like recess portion 33.

Operation and effect of the embodiment, that is, countermeasure examples of the abnormal inner face are enumerated as follows.

That is, according to the apparatus of fabricating the recording head 1, the projected streak portion 53*c* is provided with the inner wall forming portion 53*d* for forming the inner wall 28*c* in the depth direction of the groove-like recess portion 33, and the inclined face portion 53*e* formed by recessing the bottom portion 33*a* of the groove-like recess portion 33 substantially in the V-like shape continuous to the inner wall forming portion 53*d* and is provided with the connecting face portion 53*g* for connecting the inner wall forming portion 53*d* and the inclined face portion 53*e*. Therefore, when the projected streak portion 53*c* is pressed to the metal material plate 55, a large amount of the metal material is pressed to be divided by the inclined face portion 53*e* disposed at the front end portion, however, at the connecting face portion 53*g*, an amount of flow of the metal pressed to be divided is reduced. Therefore, a compression force, a shear force or the like received by the metal material at the connecting face portion 53*g* is reduced and the phenomenon of cutting off the metal material is not brought about. By such a flow phenomenon of the metal material, abnormal recesses and projections, or a scratch mark in the direction of pressing the projected streak portion is not formed at the inner face of the groove-like recess portion 33. Further, the fluidity of the metal material is achieved smoothly by the connecting face portion 53*g* and therefore, the material is promoted to move to the gap portion 53*b* formed between the respective projected streak portions 53*c*, and the partition wall portion 28 formed at the gap portion 53*b* can be formed by a sufficient height. Further, the volume of the groove-like recess portion 33 is not considerably reduced by installing the connecting face portion 53*g* and therefore, a hindrance is not brought about in the characteristic of ejecting ink drops of the recording head 1.

The triangle formed by the intersecting portion a at which the extended face of the inner wall forming portion 53*d* and the extended face of the inclined face portion 53*e* are intersected, the inner wall forming portion side end portion b of the connecting face portion 53*g*, and the inclined face portion side end portion c of the connecting face portion 53*g* is constituted by the shape of substantially the isosceles constituting the base by the connecting face portion 53*g* on the imaginary section orthogonal to the longitudinal direction of the projected streak portion 53*c* and therefore, the compression force, the shear force or the like received by the metal material at the connecting face portion 53*g* can be minimized. On the other hand, when the mode of the isosceles is changed, the connecting face portion 53*g* constituting the base is moved to an erected side or moved to a lying side. When moved to the erected side, a corner portion reducing the angle of intersecting the inclined face portion 53*e* and the connecting face portion 53*g* is formed and the above-described abnormal inner face is constituted. Further, when moved to the lying side, a corner portion reducing the angle of intersecting the inner wall forming portion 53*d* and the connecting face portion 53*g* is formed and the above-described abnormal inner face is constituted. Therefore, by maintaining substantially the isosceles, the corner portion by which the intersecting angle is not excessively reduced can be formed and therefore, the problem of the abnormal inner face is resolved.

The narrow angle made by the pressing direction O-O (imaginary plane) of the projected streak portion 53*c* and the connecting face portion 53*g* is 8 through 40 degrees and therefore, the state of inclining the connecting face portion 53*g* can properly be set and occurrence of the abnormal inner face 33*b* can firmly be prevented.

The narrow angle made by the pressing direction O-O (imaginary plane) of the projected streak portion 53*c* and the inclined face portion 53*e* is 40 through 50 degrees and therefore, the metal material is made to flow by the excellent fluidity by pressing the projected portion 53*c* to the metal material plate 55. Further, the angle of intersecting the inclined face portion 53*e* and the connecting face portion 53*g* is not abnormally reduced and therefore, an adverse effect by the corner portion is not brought about.

Since the dimension W1 in the width direction of the projected streak portion 53*c* between the inclined face side end portion c of the connecting face portion 53*d* and the inner wall forming portion 53*d* is constituted by the ratio of 0.05 through 0.15 as compared with the width dimension W2 of the gap portion 53*e*, the length of the inclined face portion 53*e* can be made to be proper, and the metal moving amount when the large amount of the metal material is pressed to be divided by the inclined face portion 53*e* disposed at the front end portion can be controlled not to be excessively large or excessively small relative to the flow amount of the metal at the connecting face portion 53*g*. Thereby, the above-described problem of the abnormal inner face 33*b* or the like is resolved.

Since the dimension W1 in the width direction of the projected streak portion 53*c* between the inclined face side end portion c of the connecting face portion 53*g* and the inner wall forming portion 53*d* is constituted by the ratio of 0.06 through 0.45 as compared with the width dimension W3 of the gap portion 53*b*, the length of the inclined face portion 53*e* can be made to be proper, and the metal moving amount when the large amount of the metal material is pressed to be divided by the inclined face portion 53*e* disposed at the front end portion can be controlled not to be excessively large or excessively small relative to the flow amount of the metal at the connecting face portion 53*g*. Thereby, the above-described problem of the abnormal inner face 33*b* or the like is resolved.

Since the connecting face portion 53*g* is a plane, boundary portions (b, c) among the connecting face portion 53*g*, the inclined face portion 53*e* and the inner wall forming portion 53*d* are made to be easy to determine and a size and a degree of inclining the connecting face portion 53*g* can accurately be set.

Since the connecting face portion 53*g* is a curved face, and boundary portions (b, c) among the inclined face, the inclined face portion 53*e* and the inner wall forming portion 53*d* are made to be continuous smoothly and therefore, the fluidity of the metal material can be made to be smooth. Further, a reduction in the volume of the groove-like recess portion 33 can be minimized.

Further, according to the method of fabricating the recording head 1, the projected streak portion 53*c* of the first die 51*a* is provided with the inner wall forming portion 53*d* for forming the inner wall 28*c* in the depth direction of the groove-like recess portion 33, and the inclined face portion 53*e* formed by recessing the bottom portion 33*a* of the groove-like recess portion 33 substantially in the V-like shape continuously to the inner wall forming portion 53*d*, and is provided with the connecting face portion 53*g* for connecting the inner wall forming portion 53*d* and the inclined face portion 53*e*. Further, the second die 52*a* for supporting the metal material plate 55 is prepared. Therefore, when the projected streak portion 53*c* is pressed to the metal material plate 55, the large amount of the metal material is pressed to be divided by the inclined face portion 53*e* disposed at the front end portion, however, at the connecting face portion 53*g*, the flow amount of the metal pressed to be divided at the connecting face portion 53*g* is reduced. Further, the compression force, the shear force or the like received by the metal material at the connecting face portion 53*g* is reduced and the phenomenon of cutting off the metal material is not brought about. The abnormal recesses and projections, the scratch mark in the direction of pressing the projected streak portion or the like is not constituted at the inner face of the groove-like recess portion 33 by such a flow phenomenon of the metal material. Further, the fluidity of the metal can be achieved smoothly by the connecting face portion 53*g* and therefore, the material is promoted to move to the gap portion 53*b* formed between the respective projected streak portions 53*c* and the partition wall portion 28 formed at the gap portion 53*b* can be formed by the sufficient height. Further, the volume of the groove-like recess portion 33 is not considerably reduced by installing the connecting face portion 53*g* and therefore, a hindrance is not brought about in the characteristic of ejecting ink drops of the recording head 1.

Further, according to the recording head 1, the groove-like recess portion 33 is provided with the inner wall 28*c* formed in the depth direction, the bottom portion 33*a* formed by being recessed by substantially the V-like shape, and the continuous face 33*c* at which the inner wall 28*c* and the bottom portion 33*a* are continuous in the smooth face state. Therefore, the rigidity of the root portion of the partition wall portion 28 formed between the respective groove-like recess portions 33 is increased by the continuous face 33*c* and therefore, so-to-speak cross talk by which a pressure variation of ink in the pressure generating chamber 29 effects an influence on other of the pressure generating chamber 29 can be avoided. Further, since the inner face of the pressure generating chamber 29 is smooth, air bubbles mixed into ink are not caught by the inner face, which is preferable for discharging air bubbles.

Figure 28:
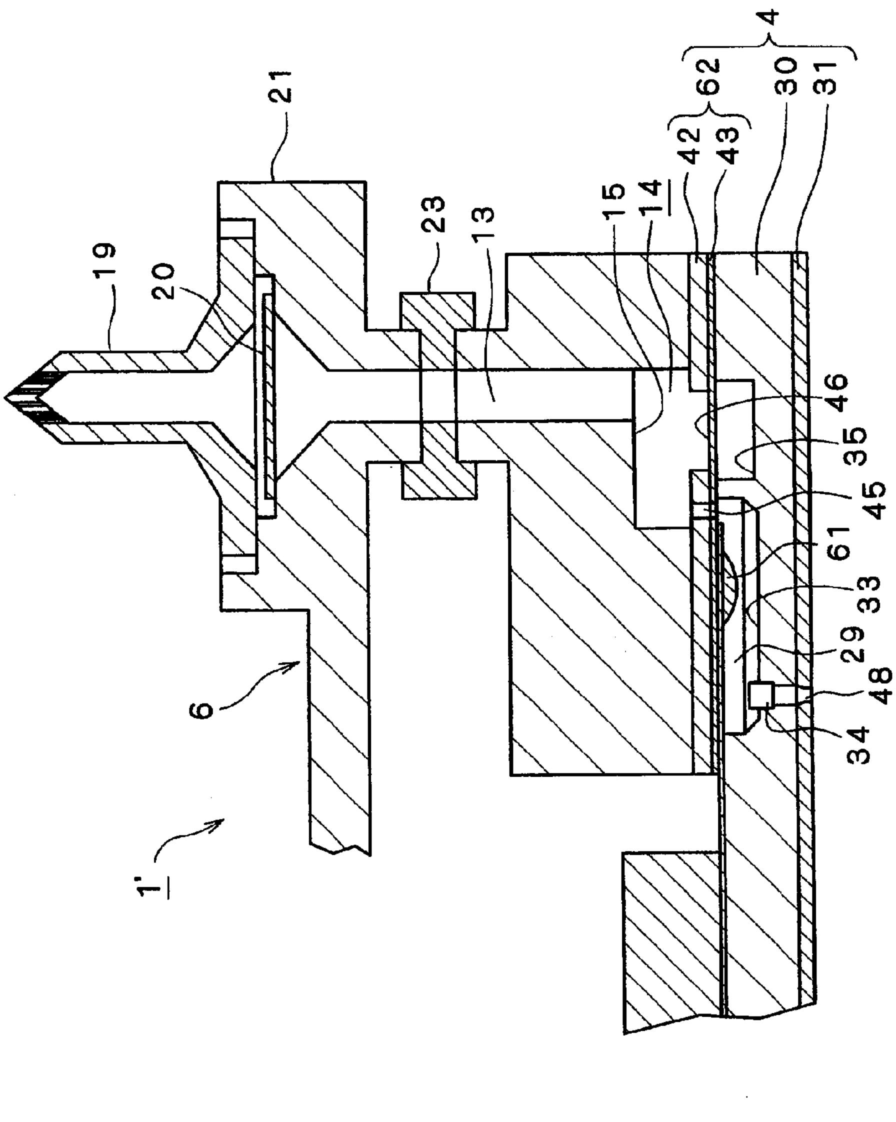
FIG. 28 is a sectional view for explaining an ink jet type recording head of a modified example.

A recording head 1' exemplified in FIG. 28 is a case to which the invention can be applied and a heat generating element 61 is used as a pressure generating element. According to the example, a sealing board 62 similar to the elastic plate 32 is used and the side of the groove-like recess portion 33 of the pressure generating chamber forming plate 30 is sealed by the sealing board 62. Further, according to the example, the heat generating element 61 is attached to a surface of the sealing board 62 in the pressure generating chamber 29. The heat generating element 61 is fed with electricity via an electric wire to generate heat. Further, other constitutions of the pressure generating chamber forming plate 30, the nozzle plate 31 and the like are similar to those of the above-described embodiment and therefore, an explanation thereof will be omitted.

Although in the above-described embodiments, tentative forming and finish working are carried out by using the single first die 51*a*, that is, the single projected streak portion 53*c*, it is also possible to prepare an exclusive projected streak portion for tentative forming and an exclusive projected streak portion for finishing, respectively.

According to the recording head 1', by feeding electricity to the heat generating element 61, ink in the pressure generating chamber 29 is bumped and air bubbles produced by the bumping pressurizes ink in the pressure generating chamber 29. Ink drops are ejected from the nozzle opening 48 by the pressurizing. Further, also in the recording head 1', the pressure generating chamber forming plate 30 is fabricated by plastic deformation of a metal and therefore, operation and effect similar to those of the above-described embodiment are achieved.

Further, with regard to the communication port 34, although in the above-described embodiment, an explanation has been given of an example of providing the communication port 34 at one end portion of the groove-like recess portion 33, the embodiment is not limited thereto. For example, the ink supply port 45 and the common ink chamber 14 communicate therewith may be arranged at the both ends in the longitudinal direction of the groove-like recess portion 33 by arranging the communication port 34 substantially at a center in the longitudinal direction of the recessed groove portion 33. Thereby, stagnation of ink in the pressure generating chamber 29 reaching the communication port 34 from the ink supply port 45 can be prevented and therefore, the constitution is preferable.

Although the above-described respective embodiments constitute the object by the ink jet type recording apparatus, the liquid ejection head provided by the invention does not constitute only by ink for the ink jet type recording apparatus but can eject glue, manicure, a conductive liquid (liquid metal) or the like. Further, although according to the above-described embodiment, an explanation has been given of the ink jet type recording head using ink as one of liquids, the embodiment is also applicable generally to liquid ejection heads for ejecting liquids of a recording head used in an image recording apparatus of a printer or the like, a colorant ejecting head used in fabricating a color filter of a liquid crystal display or the like, an electrode material ejecting head used in forming an electrode of an organic EL display, FED (face light emitting display) or the like, or an organic living body ejecting head used for fabricating a biochip or the like.

What is claimed is:

1. A method of fabricating a liquid ejection head including: a pressure generating chamber forming plate that is made of a metal, that has groove-like recess portions aligned to form pressure generating chambers and that is formed with communication ports penetrated in a plate thickness direction at one end of the groove-like recess portions; a nozzle plate bored with nozzle openings at positions in correspondence with the communication ports and a sealing plate that is made of a metal and that is for sealing opening faces of the groove-like recess portions, the liquid ejection head being constituted by bonding the sealing plate to a side of the pressure generating chamber forming plate where the groove-like recess portions are formed and also bonding the nozzle plate to an opposite side of the pressure generating chamber forming plate, the method comprising the steps of:

preparing a first die including projected streak portions aligned in parallel by a predetermined pitch and gap portions formed between adjacent projected streak portions, wherein each of the projected streak portions includes: an inner wall forming portion for forming an inner wall of a corresponding groove-like recess portion extending in a depth direction of the corresponding groove-like recess portion; a connecting face portion; and an inclined face portion, continuous via the connecting face portion to the inner wall forming portion, for forming a bottom portion of the corresponding groove-like recess portion into a substantially V-like shape, wherein an inner face of the corresponding groove-like recess portion includes: a face of the inner wall; the connecting face portion; the inclined face portion; and a face of the bottom portion, wherein the connecting face portion and the inclined face portion are connected between the face of the inner wall and the face of the bottom portion, and wherein the connecting face portion has an arc shape; and preparing a second die; and pressing the projected streak portions of the first die to a metal plate to form the groove-like recess portions, while supporting the metal plate by the second die.

* * * * *